United States Patent [19]
Rouhani

[11] Patent Number: 5,580,675
[45] Date of Patent: Dec. 3, 1996

[54] METHOD AND APPARATUS FOR INDICATING ELECTRIC CHARGE REMAINING IN BATTERIES BASED ON ELECTRODE WEIGHT AND CENTER OF GRAVITY

[75] Inventor: S. Zia Rouhani, Idaho Falls, Id.

[73] Assignee: Lockheed Idaho Technologies Company, Idaho Falls, Id.

[21] Appl. No.: 289,164

[22] Filed: Aug. 11, 1994

[51] Int. Cl.$^6$ ................................................. H01M 10/48
[52] U.S. Cl. ............................................ 429/90; 429/91
[58] Field of Search ................................ 420/90, 91, 92, 420/93; 320/48, 30, 31; 324/425, 435; 73/32 R, 451, 291

[56] References Cited

U.S. PATENT DOCUMENTS

| | | | |
|---|---|---|---|
| 3,484,681 | 12/1969 | Grady | 324/29.5 |
| 3,617,850 | 11/1971 | Domshy | 320/31 |
| 3,895,284 | 7/1975 | Schweizer et al. | 320/48 |
| 3,898,548 | 8/1975 | Perelle et al. | 320/48 |
| 3,906,329 | 9/1975 | Bader | 320/44 |
| 4,203,065 | 5/1980 | Whitford | 320/43 |
| 4,307,330 | 12/1981 | Belot | 320/44 |
| 4,308,817 | 1/1982 | Peterson | 429/90 X |
| 4,539,270 | 9/1985 | Mejia | 429/91 |
| 4,581,122 | 4/1986 | Hammond et al. | 429/91 X |
| 4,989,453 | 2/1991 | Hiiesalu | 429/91 |
| 5,315,228 | 5/1994 | Hess et al. | 320/31 |
| 5,315,253 | 5/1994 | Alexandres et al. | 324/429 |

*Primary Examiner*—Anthony Skapars
*Attorney, Agent, or Firm*—Mallinckrodt & Mallinckrodt

[57] ABSTRACT

In most electrochemical batteries which generate electricity through the reaction of a battery electrode with an electrolyte solution, the chemical composition, and thus the weight and density, of the electrode changes as the battery discharges. The invention measures a parameter of the battery which changes as the weight of the electrode changes as the battery discharges and relates that parameter to the value of the parameter when the battery is fully charged and when the battery is functionally discharged to determine the state-of-charge of the battery at the time the parameter is measured. In one embodiment, the weight of a battery electrode or electrode unit is measured to determine the state-of-charge. In other embodiments, where a battery electrode is located away from the geometrical center of the battery, the position of the center of gravity of the battery or shift in the position of the center of gravity of the battery is measured (the position of the center of gravity changes with the change in weight of the electrode) and indicates the state-of-charge of the battery.

50 Claims, 16 Drawing Sheets

METHOD AND APPARATUS FOR INDICATING ELECTRIC CHARGE REMAINING IN BATTERIES BASED ON ELECTRODE WEIGHT AND CENTER OF GRAVITY

CONTRACTUAL ORIGIN OF THE INVENTION

The United States Government has rights in this invention pursuant to Contract No. DE-AC07-76ID01570 between the United States Department of Energy and EG&G Idaho, Inc.

BACKGROUND OF THE INVENTION

1. Field

The invention is in the field of methods and apparatus for determining the remaining charge or useful life (state-of-charge) of an electrochemical battery.

2. State of the Art

Primary electric batteries of different kinds are used for generation of electricity through conversion of chemical energy, from the reaction of their electrodes with the electrolyte solution, into electric current with a certain voltage. Once the reactive mass of the electrodes or the electrolyte is depleted, these batteries are finished and must be replaced. These primary batteries are usually manufactured for supplying limited amounts of electricity and are used in a wide range of equipment. Secondary batteries that can be recharged after depletion are capable of delivering considerable amounts of electricity with high currents and are used in a wide variety of applications, such as backup power supplies, or as the main source of power in some electric vehicles. In these batteries, the chemical energy from the reactions between the electrodes and the electrolyte that is spent on producing electricity, can be replenished by reversing the chemical reactions on the electrodes during a recharging process that involves passing an electric current, from another source, through the battery in the reverse direction. The amount of electric energy that can be extracted from a battery depends on its electric potential, expressed in Volts, and the number of Coulombs or the electric current intensity times its duration, expressed in Ampere-hours, that the battery can sustain.

A common feature of most electric batteries is their relatively constant voltage during use. The voltage is not usually dependent on the battery's charge content so an instantaneous measurement of a battery voltage does not relate to the quantity of charge remaining in the battery. Only when the battery gets close to being completely discharged does its voltage start to drop off noticeably. In other words, the battery voltage is independent of its energy content. This is particularly true in some lithium batteries. Although this is a very desirable feature in almost all cases of battery applications, it causes a problem when it comes to indicating the amount of charge that is left in a battery. It is desirable in many cases, and in some situations it is essential, to know exactly how much energy is available in a battery system at any instant during its use. A special situation of this kind is when a battery is used for powering an electric vehicle. It is obvious that the operator of the vehicle has to know the energy content of his battery at all times for planning his travel duration and for a timely renewal of its energy content. In some military situations, a correct estimate of the remaining electric charge in a battery system may be critically important to the mission of the system that runs on that battery. For these reasons, the subject of indicating the remaining charge in electric batteries has received the attention of many inventors and there are a large number of patents dealing with "state-of-charge" indicators for batteries. Examples are U.S. Pat. Nos. 3,484,681, 3,617,850, 3,895,284, 3,898,548, 3,906,329, 4,307,330, 5,315,228, and 5,315,253.

Most of the devices described in the prior art patents measure the electrical signals of a battery cell or measure charging current into a battery and current taken from the battery and, using them in a variety of procedures, estimate how much electric charge is left in the battery at any moment. Examples include measurements of voltage and time-integrated currents that pass through the battery, in charging and discharging situations, along with temperature measurements for applying necessary correction factors. A common disadvantage of most of these patented methods and devices is the necessity of continuous monitoring and electronic book-keeping of the past current history of the battery, and none of them is a truly instantaneous charge indicator.

A different approach is shown by U.S. Pat. No. 4,129,824 which measures the specific gravity of the acid solution in a lead acid storage battery and equates the specific gravity measured to the charge left in the battery. This approach assumes that the specific gravity of the acid solution is an accurate measure of the charge and does not take into account dilution of the solution, evaporation of the solution, or disassociation of the solution which occurs during charging, all of which have an effect on the density of the solution unrelated to the charge remaining in the battery. Further, this methods applies only to lead-acid batteries and it is not suggested as universally applicable to a wide variety of types of batteries.

There remains a need for an accurate system for measuring the charge in a battery that can be applied universally to and used with a variety of types of batteries.

SUMMARY OF THE INVENTION

Most batteries produce electrical energy through a chemical reaction between an electrolyte solution in a battery and at least one electrode in contact with the electrolyte solution, or through a chemical reaction between two electrodes of a battery through an electrolyte solution in the battery. As the reaction takes place, mass is transferred or exchanged between electrode and electrolyte, or between electrodes, through the electrolyte. The chemical reaction takes place during the discharge of the battery to create the current that is supplied to a load during battery discharge. As the chemical reaction takes place, the weight and density of the reacting electrode or electrodes changes. The weight of an electrode changes gradually from one value which is the weight of the electrode with the battery in a fully charged condition to another value which is the weight of the electrode with the battery in a functionally discharged condition in which it can no longer supply the voltage and current necessary for a particular purpose for which the battery is used. The change takes place in substantially linear fashion as the battery discharges from its substantially fully charged condition to its functionally discharged condition. If the battery is a rechargeable battery, the chemical reaction is reversed during recharging so that the electrode weight change is reversed and the weight of the electrode moves back toward the value it has when fully charged.

According to the invention, the amount of charge in a battery at any time can be determined by measuring the weight of a battery electrode at that time and relating that measured weight to the weight of the electrode when the battery is substantially fully charged and the weight of the electrode when the battery is functionally discharged. Where the measured weight falls between the fully charged and functionally discharged weights indicates the amount of charge remaining. For example, if the measured weight falls half way between the fully charged and functionally discharged weights, the battery has about one half of its normal charge remaining. If used in conjunction with an electrically powered vehicle, and the vehicle can travel one hundred miles with a fully charged battery, one would know that the vehicle could travel fifty miles on the remaining charge in the battery. The indication given by the invention can be similar to that given by current automobile fuel gauges with an indicator or pointer positioned between a full indication and an empty indication to indicate how much charge is left in the battery.

Since there are numerous ways in which to obtain an indication, directly or indirectly, of the weight of a battery electrode at a particular time and relate it to the fully charged and functionally discharged weights, the invention may be implemented in a variety of ways. Thus, there are a number of different battery parameters that change as a result of a change in battery electrode weight and which can be measured to provide an indication of change in the battery electrode weight. The parameter measured may be the electrode weight, in which case the actual weight of the electrode in a battery is measured. Where the electrode is positioned in the battery away from the geometric center of the battery, as the weight of the battery electrode changes, the center of gravity of the battery as a whole changes. This change or shift in the center of gravity can be measured and is a battery parameter indicative of the weight of the electrode and indicative of the charge in the battery. Generally, both positive and negative electrodes of a battery will change in weight as the battery discharges, often with one electrode gaining weight while the other electrode loses weight. In such instance, with both electrodes located off center in the battery or in a cell of a battery, the change or shift in the center of gravity is easily measurable. With such measurement, it is not necessary to relate them to the actual weights of an electrode, but merely relate them to the position of the center of gravity of the battery when fully charged and the center of gravity of the battery when functionally discharged.

Measuring the weight of one or more of the electrodes in a battery or battery cell may be advantageously used in connection with batteries having liquid electrolyte such as lead-acid batteries. In such case, the anode and cathode electrodes, with porous spacers therebetween, will generally be bound together as an electrode package. Hangers extend from the electrode package and the electrode package is suspended by one or more load cells positioned between the hangers and a battery casing which measure the sensible weight of the electrode package. Because the electrode package is suspended in the electrolyte and the electrolyte exerts a buoyancy force on the electrode package suspended therein, the weight measured by a load cell is the sensible or measured weight of the electrode package which is the difference between the true weight (the weight of the package if suspended in a vacuum, and, for practical purposes, considered the weight of the package suspended in air) and the buoyancy force of the electrolyte acting on the electrode package. Thus, the sensible or measured weight will be less than the true weight of an electrode or the electrode package.

If the weight of an electrode or an electrode package is to be measured for a battery in which the density of the electrolyte can change, since a change in density will change the buoyancy of the electrolyte and thus the sensible weight of the electrode or electrode package, it will usually be desirable to measure the density of the electrolyte and correct the measured sensible weight of an electrode or electrode package for changes in electrolyte density. Independent corrections may also be made for changes in electrode temperature. Where the battery is installed in a moving environment, such as in a vehicle, corrections may also desirably be made for battery position and to eliminate variations in measured sensible weight due to battery movement and vibration.

Where a battery's center of gravity changes as the charge of the battery changes, the charge in the battery may be determined by placing the battery in a holder that can determine the position of the center of gravity and relate it to the charge in the battery. Such a holder may simply display a direct visual reading of the charge of the battery or provide electrical signals to electronic circuitry which displays the charge in the battery through a display device. If a battery having a cylindrical casing is constructed with an eccentrically located electrode, the battery, when placed on a level, flat surface will roll to and to rest at a position determined by the position of its center of gravity. The battery casing can be marked to display the charge of the battery by the particular rest position of the battery.

When used with batteries or battery applications having multiple battery cells or multiple batteries, each of the cells or batteries may be equipped with a charge indicator of the invention to individually monitor the charge for each cell or battery, or one or more of the cells can be equipped with a charge indicator to monitor, on a representative basis, the charge of the individual cells or batteries.

If the method of the invention is to be used in a weightless environment, an apparatus of the invention can include means to impart acceleration to a battery when it is desired to determine the charge of the battery. This allows sensible weight measurements to be obtained during such acceleration. The sensible weight measurements are then related to and corrected for the acceleration and related to the charge of the battery. Similarly, measurements of the position of the center of gravity of a battery can be obtained during such acceleration and related to the charge of the battery.

BRIEF DESCRIPTION OF THE DRAWINGS

The best modes presently contemplated for carrying out the invention are illustrated in the accompanying drawings, in which.

DETAILED DESCRIPTION OF THE INVENTION

Figure 1:
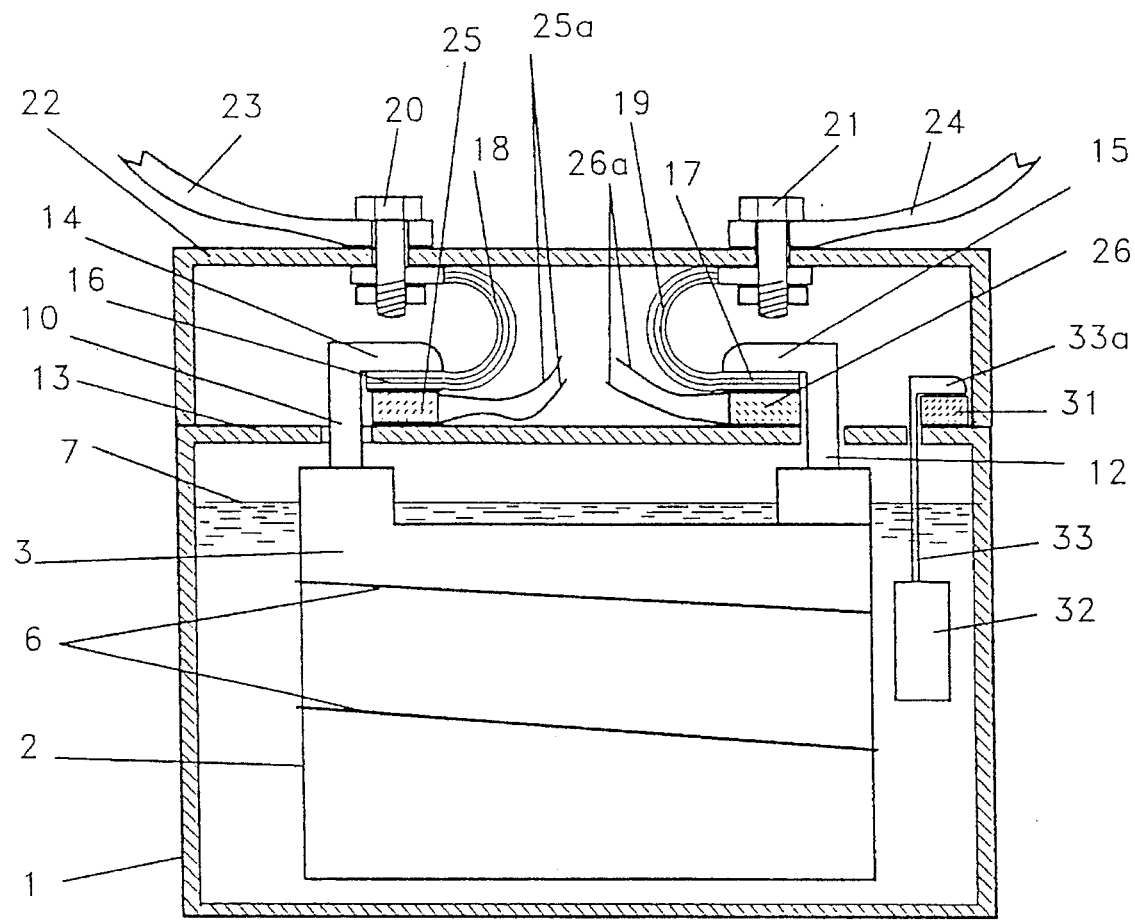
FIG. 1 is a schematic vertical section of a battery equipped with weight measuring devices of the invention for measuring the weight of its electrodes and including an electrolyte density indicator.

Generally all electrochemical batteries, regardless of the actual materials used for the electrodes or the electrolytes, provide electricity as a result of chemical reactions between the electrodes and the electrolyte. Examples of common electrochemical batteries are: lithium-silver chromate and zinc-air primary (non-rechargeable) batteries, lead-acid, nickel-cadmium, and lithium secondary (rechargeable) batteries. The specific chemical reactions that take place during discharge are quite different in different batteries. However, all the reactions involve exchange of mass between the electrodes and the electrolyte or, between the two electrodes through the electrolyte, and these mass exchanges are invariably accompanied by some changes in weights and the densities of the reactive masses on the electrodes. The changes in the weights of the electrodes that accompany the discharging and recharging of the batteries can be measured in a number of different ways and correlated with the remaining charge in the batteries. As described with a few examples below, this process can be applied to almost all types of primary and secondary electrochemical batteries. The basic principle of this process can be quantitatively expressed by the following examples:

In a fresh lithium/silver chromate cell (primary type battery), one of the electrodes (the anode) is lithium metal with an atomic weight of 6.94. As the battery discharges, the lithium turns into lithium chromate, $Li_2CrO_4$ whose molecular weight is 213.9 atomic units. The relative weight change for each lithium atom in this case is 29.82 times, or 2,982%. This is a very large weight change and is measurable.

In a fully charged lead-acid battery, one electrode is metallic lead, Pb and the other electrode is lead oxide, $PbO_2$. When discharged, the metallic lead becomes $PbSO_4$ (lead sulfate). The weight change for each lead atom is from 207 to 303 units of atomic mass. This means a 46.3% increase of weight in the reactive lead mass. When the battery is recharged again, the lead sulfate is reduced to its initial components, $SO_4$ going back to the electrolyte and Pb reforming as the metallic mass on the electrode with its original lower weight, except for some gradual losses that will occur in repeated charging and discharging. Obviously, the calculated relative weight increase of 46.3% in this case applies only to the reactive lead mass, and not to the whole electrode that has some nonreactive material, or dead-weight in it. But, even considering the dead-weight, the net change in weight will still be the same and quite measurable.

In a fully charged nickel-cadmium battery, one electrode is metallic cadmium, Cd, and the other electrode is trivalent nickel hydroxide, NiOOH. When discharged, the metallic cadmium becomes cadmium hydroxide, $Cd(OH)_2$. The weight change in this case is from 112.4 atomic units to 146.4 units, or 30.2% relative increase of weight in the reactive cadmium mass.

Weight changes of this kind may be calculated for either one or both electrodes of almost all types of electrochemical batteries.

The battery charge indication of the invention is based on measuring the weight changes of electrodes, either individually or collectively, and either directly or indirectly, and relating them to the similarly measured weights of those electrodes in fully charged and functionally discharged states, in order to gauge the state-of-charge in the battery at any time. The weight measurements may be done directly by measuring the force of gravity acting on one or both electrodes, or indirectly by measuring the shift in the center of gravity of a battery system, or by measuring the response of an accelerometer attached to the whole or parts of a battery subject to a given accelerating force. Some examples of embodiments of the invention are described below.

Figure 2:
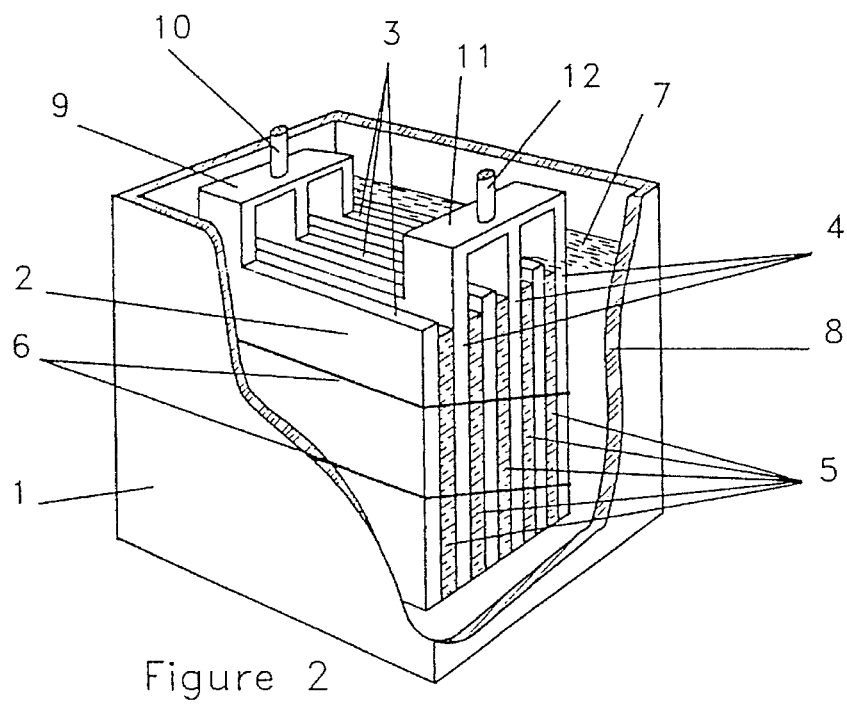
FIG. 2, a cut away perspective view of the electrode package inside a battery cell.

FIGS. 1 and 2 show a specially designed lead-acid battery cell 1 for use in a stationary system. The electrode package 2, consists of lead anode plates 3, lead oxide cathode plates 4, and spacers 5 that are packaged and firmly tied together by non-conducting threads 6, such that the relative position of the electrodes remain unchanged with respect to each other. The whole electrode package 2 is submerged and suspended in the electrolyte liquid 7 which is a mixture of water and sulfuric acid. Spacers 5 are of a porous material or are configured so as to allow circulation of electrolyte to the various electrodes. The electrode package 2 and the electrolyte 7 are contained inside the battery cell walls 8 which form a battery cell casing and the anode plates 3 are mechanically and electrically tied together with a cross-bar 9 that is attached to the connecting pole or hanger 10 for the anode. Similarly, the cathode plates 4 are tied together with another cross-bar 11 that is attached to its connecting pole or hanger 12. FIG. 1 further shows the arrangement above the top 13 of the battery cell casing for measuring the force of gravity on the whole electrode package at any time. As shown, the hangers 10 and 12 each have a horizontally bent arm 14 and 15, respectively, that rest on end segments 16 and 17 of respective electric conducting cables 18 and 19, said cables being made of non-stiff, braided, fine metallic strands for flexibility and to prevent mechanical tension that might distort a weight measurement from being applied to the hangers. The cables will add a fixed weight component to the electrode packages. The other ends of the flexible cables 18 and 19 are anchored by bolts 20 and 21, respectively, under a rigid, non-conducting top extension or bridge 22 that spans over the top plate 13 of the battery and is firmly attached to the said plate. The electrical cables 23 and 24 that connect the battery 1 to an outside electric circuit are anchored on top of the solid bridge 22 by bolts 20 and 21 that, also, establish the electric contact between each cable and its corresponding pole contact 16 or 17 under the bridge. The purpose of the top bridge 22 is to transfer mechanical tensions from the outside cables 23 and 24 directly to the battery casing though its top plate 13 and to protect the hangers 10 and 12 against any components of such mechanical tensions in the outside cables. The end segments 16 and 17 of flexible cables 18 and 19 rest on two load cells 25 and 26 that together carry the total weights of the whole electrode package 2, their connecting poles or hangers 10 and 12, and parts of the weights of the flexible connectors 18 and 19. The electrode package that is suspended in the battery electrolyte will be subject to buoyancy forces exerted by the electrolyte on the electrode package. Thus, the load cells will not measure the true weight of the electrode package, but only the sensible weight. Part of the sensible gravity forces that are transferred to the load cells 25 and 26 are constant and some of the forces change as the electrodes are charged or discharged. The variable components of the gravity force can be separated and correlated with the state of charge in the battery. The load cells 25 and 26 may be any of the commercially available devices that measure force, or gravity in this case, and the mechanism of their operation may be based on the special resistor effect used in strain-gauges, or based on Piezoelectric or other special semi-conductor effects, with the latter ones being more suitable because of their low price and higher sensitivities. The main advantage of these load cells is that they need only some microscopical displacement under the force that is being measured and hence, the electrode package need not move up and down for its weight measurement. The sensible weight measurement signals from the load cells 25 and 26 are transmitted to electronic measuring circuitry (not shown in FIGS. 1 and 2) through conductors 25a and 26a, respectively. Each load cell may have its own electronic circuitry and indicator to produce readout signals corresponding to the instantaneous forces that are acting on that cell and relating or comparing them to the signals that would be produced by that load cell if the battery was fully charged and if it was functionally discharged or the cells may share electronic circuitry that combines the signals from each cell and uses a single indicator. Such indicator will usually be a display device which shows where the measured value falls between the fully charged "full" indication and the functionally discharged "empty" indication. The readouts of the two load cells 25 and 26 together give the total gravity force that is acting on the whole electrode package 2 and all other parts that are attached to the package. In some cases, and particularly in the embodiment illustrated in FIGS. 1 and 2 since all electrodes are tied together in a package so each load cell measures a portion of the total package sensible weight rather than the sensible weights of different electrodes, it will be desirable to combine the signals from the two load cells to give just the total sensible weight that is acting on the package at any moment and compare that to the total weight of the package when the battery is fully charged and when the battery is functionally discharged.

Figure 3:
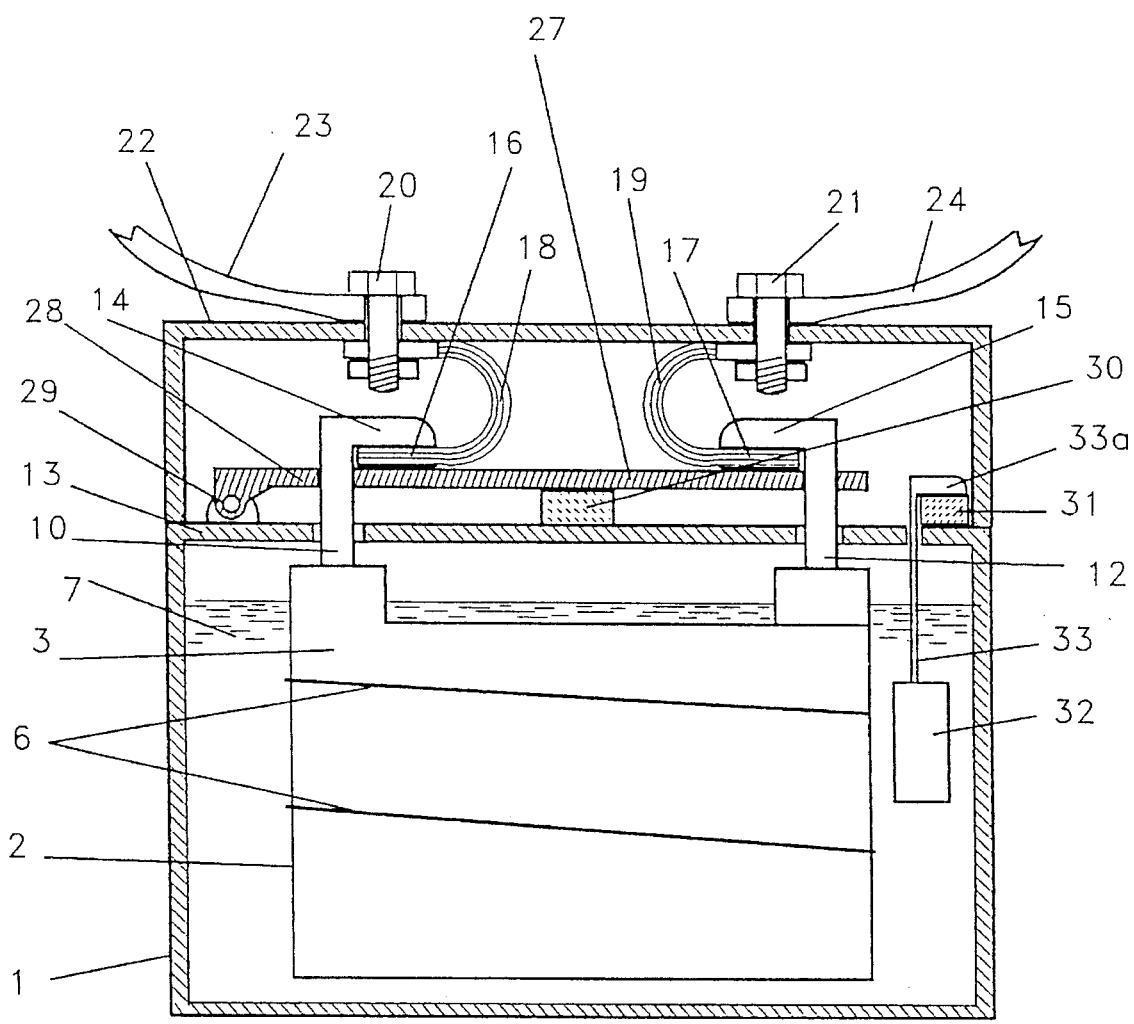
FIG. 3, a schematic vertical section of a battery similar to that of FIG. 1, but with a single load cell for electrode weight measurement.

In a second embodiment of the invention, instead of using two load cells 25 and 26, a single load cell for the whole electrode package in a battery cell may be used. FIG. 3 shows an arrangement of this kind in which the two horizontal arms 14 and 15 of the hangers 10 and 12 are attached to and rest on their respective cable terminals 16 and 17, with the terminals resting on a rigid bar 27, made of a stiff non-conducting material. Bar 27 has a short extension 28 beyond one of the poles 10 and ends at a simple hinge 29 that is firmly attached to battery top plate 13. The function of the hinge 29 is to provide one of the two necessary supporting points for the rigid bar 27 and to counteract any tendency of side movements in the bar under the effects of shifting weights between the two poles 10 and 12 that are hanging on it. Bar 27 is also supported at a point mid-way between the two poles 10 and 12 by a single load cell 30. However, the position of the load cell 30 under bar 27 may be varied. Load cell 30 will measure the variations of the total weight of the electrode package with everything else that is attached to it, and the signals from this single weight measuring cell can be calibrated to indicate the charge content of the battery at all stages between fully charged and functionally discharged.

As shown in FIGS. 1 and 3, with each of the embodiments described an additional load cell 31 is used to support a small object 32 that has a fixed mass and a fixed volume and is submerged in the electrolyte 7 inside cell 1. The mechanical connection between the submerged object 32 and the load cell 31 is a thin stiff bar 33 that has a very small cross section compared to the submerged object 32. Stiff bar 33 has a horizontal arm 33a at its upper end that rests on load cell 31. This extra arrangement is used to determine the density of the electrolyte. The density of the electrolyte can be calculated from the measured gravity force, i.e., sensible weight for the known mass and volume of object 32 as compared to the true weight of object 32. This instantaneous electrolyte density measurement captures all the practical changes that may take place through evaporation or addition of water to the electrolyte or disassociation of the electrolyte during charging.

Variations in the gravity forces or sensible weights that the two load cells 25 and 26 will be measuring during a cycle of discharging and recharging of the battery cell 1 are calculated in the following manner. These calculations take into account the effects of chemical changes, density variations, and the buoyancy forces that the electrolyte will exert on the electrodes that are submerged in it.

First, we consider the basic molecular weights and densities of the active materials in a lead-acid battery.

In a fully charged state: The anode is lead, Pb, with atomic weight 207.2, and a density of 11.34 g/cc. The cathode is lead dioxide, $PbO_2$ with molecular weigh 230.2, and a density of 9.37 g/cc. The electrolyte density is about 1.25 g/cc when the battery is fully charged.

In a fully discharged state: Both electrodes are lead sulfate, $PbSO_4$ with a molecular weight of 303.2 and a density of 6.20 g/cc and the electrolyte density is about 1.1 g/cc.

Assuming 100 grams of lead (Pb) in the anode and a corresponding mass of lead oxide $PbO_2$, which is $(100/207.2) \times 239.2 = 115.44$ grams, as starting masses, the initial lead volume is $100/11.34 = 8.82$ cc, and the initial lead-oxide volume is $115.44/9.37 = 12.23$ cc. The final lead-sulfate volume will be $2(100/207) \, 303.2/6.2 = 47.24$ cc. Using the calculated volumes and known densities, the buoyancy forces are found to be:
On the lead electrode (charged):

$$F_1 \text{ (force)} = 8.82(11.34 - 1.25) = 88.99 \, g$$

On the oxide electrode (charged):

$$F_2 = 12.23(9.37 - 1.25) = 97.04 \, g$$

On the sulfate (discharged):

$$F_3 = 47.24(6.2 - 1.10) = 240.92 \, g$$

With these numbers, the net force difference (increase) in going from charged to a discharged state turns out to be:

$$D = F_3 - (F_1 + F_2) = 240.92 - (88.99 + 97.04) = 54.89 \, g$$

This is a non-trivial difference in the buoyancy force (compared to the assumed 100 gram mass for the lead electrode). This change of weight can be measured easily by a number of different devices, among them the load cell arrangements described above.

The whole process of determining the forces of electrodes, determining electrolyte density, comparing the determined values to the fully charged and functionally discharged situations, and indicating the charge contents can be programmed into a micro-processor chip that is fed with the signals coming from the three load cells and produces an output signal indicative of the calculated results in terms of percentage of the remaining charge in the battery. This signal is sent to an indicator to provide a visual or other indication of the results. The electrode weight at full charge will be measured in the manner indicated above when the battery is fully charged. The weight when functionally discharged can be determined either by calculation of the discharged weights of the electrodes based on the known masses of the active components of the electrodes as indicated above, or practically, by allowing the battery to become functionally discharged and measuring the electrode weight. If this is done, from time to time, it can prolong the life of some batteries, and updates the battery capacity as it changes with the aging of the battery. The functionally discharged condition is identified when no weight change can be recorded while the electric load circuit is closed (active), or it can be identified as the electrode weights at a point where the battery voltage falls to a certain minimum level. Thus, for any desired use of a battery, the functionally discharged reference weight will preferably be the point where the battery can no longer supply the voltage and current required for that use.

Figure 27:
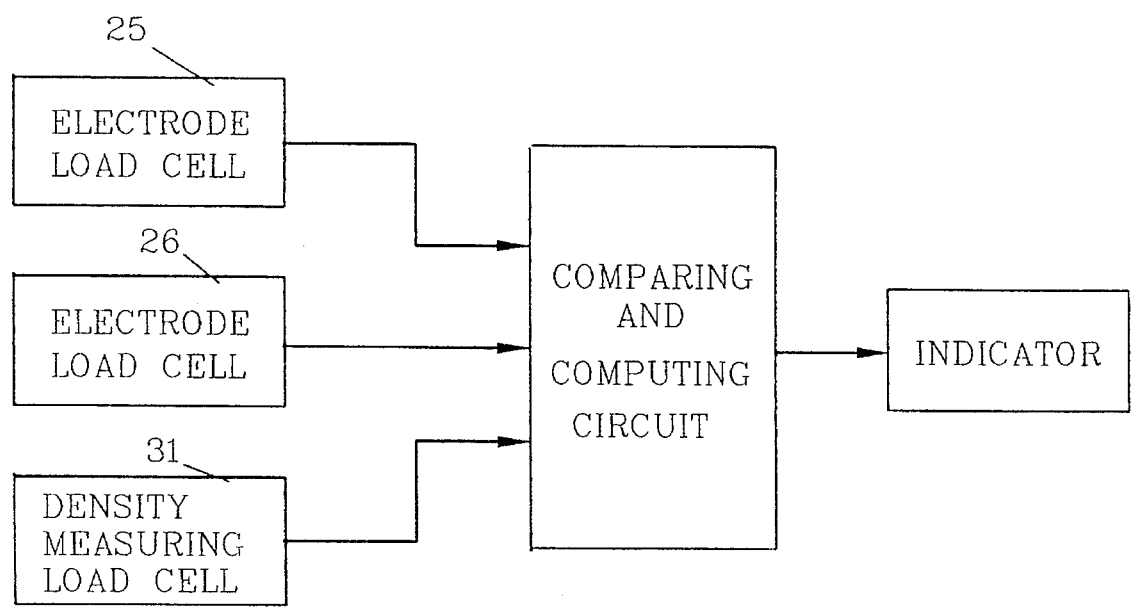
FIG. 27, a block diagram of the electronics logics system in an embodiment of the invention.

FIG. 27 shows each of electrode load cells 26 and 27 of FIG. 1, and the density load cell 31, connected to a measuring and comparing circuit. The measuring and comparing circuit could take many forms as obvious to a person skilled in the art, and, as indicated above, may include a microprocessor to calculate and combine the sensible electrode weights, correct them for electrolyte density changes, and provide an output to the indicator to cause the indicator to show how the measured sensible weights compare to fully charged and functionally discharged weights. In performing the comparison, the measured sensible weight may be converted to corrected true weights for comparison to reference fully charged and functionally discharged true weights or the reference fully charged and functionally discharged true weights may be adjusted to represent sensible weights under the same measurement conditions as used for measuring the sensible weights of the electrodes or electrode packages. The output of the measuring and comparing circuit is shown connected to the indicator, which as indicated above, gives a visual or other indication of the amount of charge remaining in the battery.

It is known that the electric storage capacity of batteries are affected by the intensity of the charging current, as well as by the current intensity of the previous discharge. These are due to variations in the crystallization sites on the electrodes and the actual growth of the crystals. An advantage of relating the battery charge content to the weight of the battery electrodes is that it captures such variations that are related to the number and size of the active crystals on the electrodes, as these will affect the measured sensible weight. Another advantage of this charge measuring technique is that it will detect potential charge losses due to any internal electric leakage between the electrodes, while such leakage currents will be hidden from any external charge indicators based on current integration.

A measurement of the level of electrolyte in the battery is required if the latter parameter is allowed to fluctuate through evaporation or addition of water. A correction factor, based on level variations compared to the level at the fully charged stage, should be included in the electrode weight change calculations. This factor will depend on the variations of the horizontal cross-sections of the electrodes, spacers and other materials submersed in the electrolyte at various levels. It is simply some incremental value of the buoyancy force that must be added to or subtracted from the measured weights, depending on the direction of change in the electrolyte level. However, since the electrolyte level is usually controlled and maintained at a specified level, this correction may be unnecessary in most cases. A further correction factor may be applied due to the effects of temperature on the densities of the electrode materials and the densities of some other attached items, such as the spacers, that are submerged in the electrolyte. The necessity and magnitude of such corrections would depend on the thermal expansion coefficients of the materials that are used in each battery construction, and if the temperature range of battery operation is large enough to make such corrections necessary. If such corrections are desired, appropriate sensors can be provided in the battery and connected to the measuring and comparing circuit of FIG. 27 and the microprocessor therein appropriately programmed to make the desired corrections.

Figure 4:
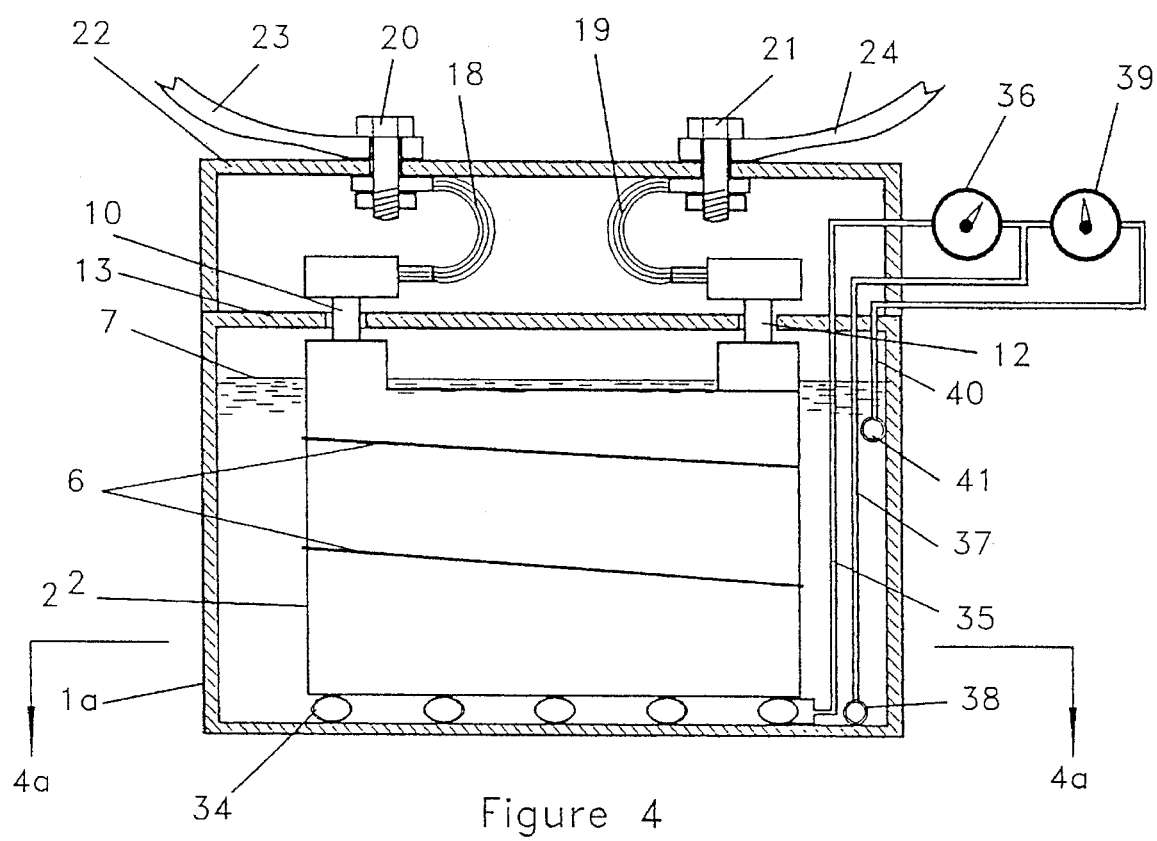
FIG. 4, a schematic vertical section of a battery similar to that of FIG. 1, but showing a hydraulic differential pressure measurement system to obtain an electrode weight.
Figure 4A:
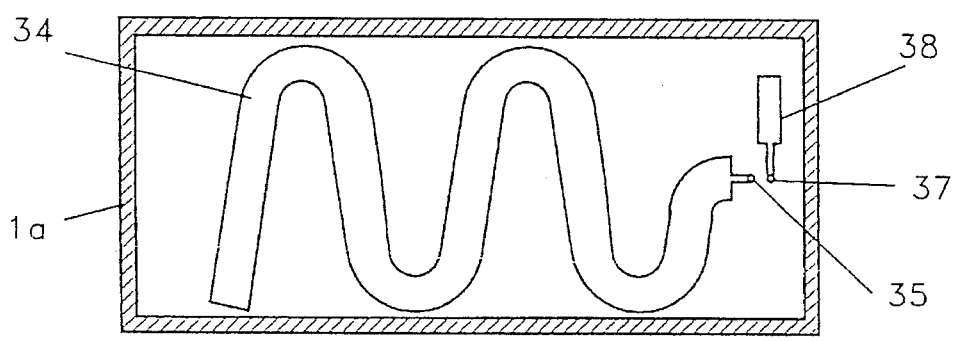
FIG. 4a, a horizontal section of the bottom of the battery cell as taken on the line 4a–4a of FIG. 4.

Instead of using one or more load cells on top of the battery, the measurement of the electrode weight or weight changes can be done through pressure difference measurements. As shown schematically in FIG. 4, the electrode package 2a may be positioned to rest on a very elastic tube 34 that is sealed at one end and placed at the bottom of the battery cell 1a in the form of a coil or, as shown in FIG. 4a, repeatedly bent in a zigzag shape. Elastic tube 34 is filled with an incompressible fluid, such as distilled water, and is connected through a small rigid tube 35 to one side of a differential pressure gauge 36 that is outside of battery cell 1a. The other side of the differential pressure gauge 36 is connected to another water filled small rigid tube 37 that extends vertically inside the battery cell 1a such that its lower end extends to the same height as the mid-plane of the bent elastic tube 34. The lower end of tube 37 is bent to extend horizontally and is closed by a short segment of very elastic tube 38, similar to tube 37, that is sealed at its end. Both segments of the elastic tubes 34 and 38 are capable of transferring the hydrostatic pressure from the electrolyte to the differential pressure gauge 36. But, while the pressure inside the tube 38 corresponds just to the hydrostatic pressure of the electrolyte near the cell bottom, the pressure inside the elastic tube 34 will be a sum of the same hydrostatic pressure and another component that is a function of the weight of the electrode package 2a on top of it. The differential pressure gauge 36 will display only the component that depends on the weight of the electrodes package 2, as the effects of hydrostatic pressure of the electrolyte will be the same on both sides and cancel each other out. Just as discussed before, the total weight of the electrodes package will include a fixed component due to all the dead weights and a variable component that fluctuates between zero and a maximum value, as the battery goes from a fully charged to a depleted state, and vice-versa when the battery is recharged. With this simple arrangement, the differential pressure gauge 36, with a proper calibration, will function as a state of charge indicator. Such a calibration may be rather exact if the variations in the electrolyte density are always the same in different charging cycles. But, in general, a correction factor for buoyancy force changes due to variations in the electrolyte density will be necessary. The electrolyte density may be measured simply with the use of another, more sensitive, differential pressure gauge 39 that is connected to tube 35 on one side and to another tube 40 whose end point is covered with another short piece of the elastic tube 41, with a closed end, and held at a higher horizontal level inside the electrolyte 7 in the battery. The readings of pressure gauge 39 are directly proportional to the height difference between the points 41 and 38 that is a constant, and the density difference between the electrolyte and pure water used inside the tubes 37 and 40 that will vary as the electrolyte density varies. It should be added that in this embodiment, the electrode package 2a should be mechanically free to have some slight vertical movement up and down in order to make the pressure inside tube 32 truly representative of its weight changes. For this reason, an arrangement with the use of very flexible connectors 18 and 19 that are solidly anchored at their ends, as shown in FIG. 1, must also be employed in this case.

While such a system with its simple components is completely practical, in practice one can use special hydraulic load cells instead of a bent elastic tube or employ sensitive pressure transducers instead of the mechanical pressure gauges. Electrical signals from the load cells or transducers may be transmitted to a measuring and comparing circuit as shown in FIG. 27, or other remote control panel, and manipulated for display of the state of charge in any desired form, such as digital, visual analog, audio or in any combination of these.

By allowing some slight movements of one or both sets of electrodes in a battery, subject to their weight variations during a charging or recharging process, it is possible to use very inexpensive means of measuring the weight changes and calibrating the variations in terms of the charge content in the battery. Such movements are made possible by allowing the electrode weights to be taken up by a spring that is firmly fixed at one end and is free to expand or contract under the influence of weight changes in the electrodes. An inexpensive arrangement in this case would be a simple mechanical indicator showing the balancing position for the moving end of the spring. Another simple means would be attachment of a small mirror, with a flat or curved surface, to the moving aggregate supporting the electrodes' weights and having a narrow beam of light from a fixed source reflected from the movable mirror onto a graded surface. The latter system can be made with any degree of accuracy, using either ordinary light or non-diffusing light from a laser source. The read-out may be merely visual or through conversion of the moving light into electrical signals with the use of light sensitive diodes or other material, converted to electrical signals to control any other form of indicator on a control panel.

The above described embodiments can be readily employed for stationary batteries. However, for movable batteries, such as those used in electric vehicles, additional arrangements are needed to hold the electrodes firmly in place and to keep the battery cell completely sealed to prevent spilling of electrolyte during movement of the battery.

Figure 5:
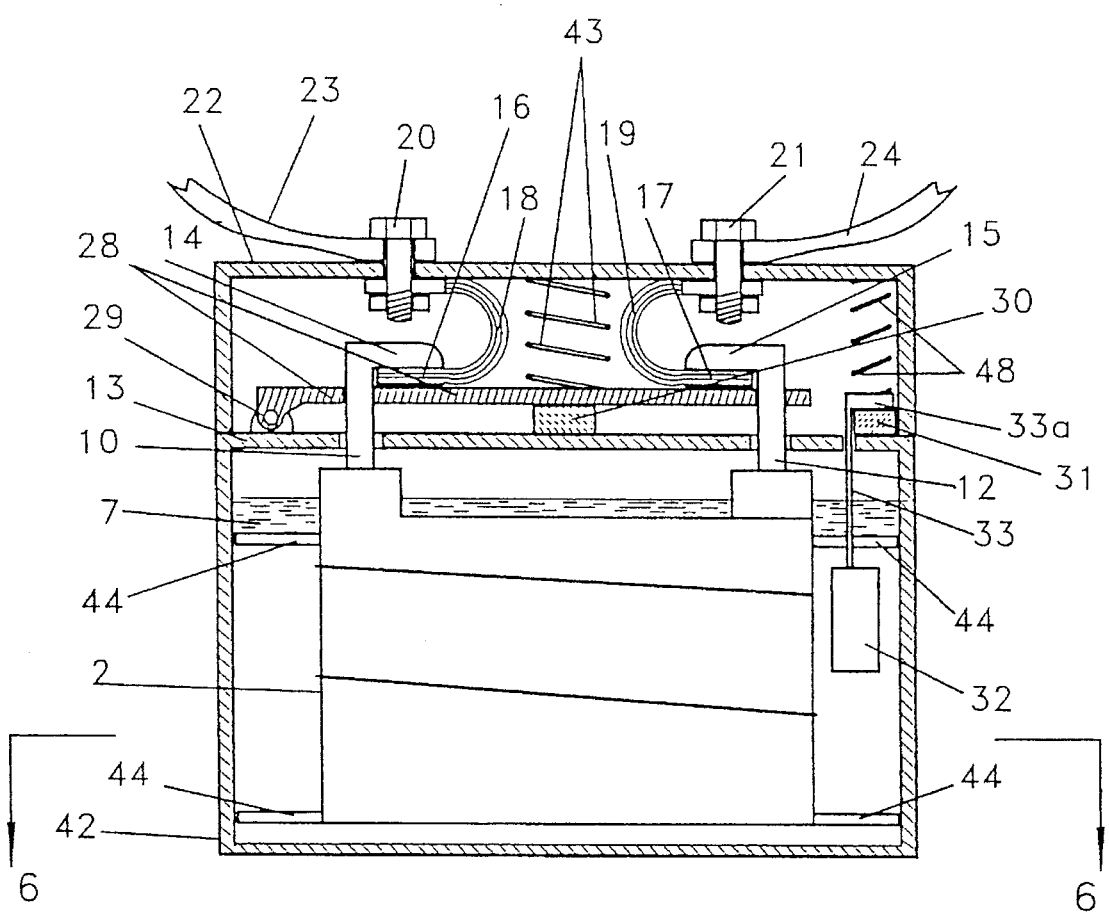
FIG. 5, a schematic vertical section of a battery similar to that of FIG. 1, but with an electrode weight measuring device that is braced for battery movement.
Figure 6:
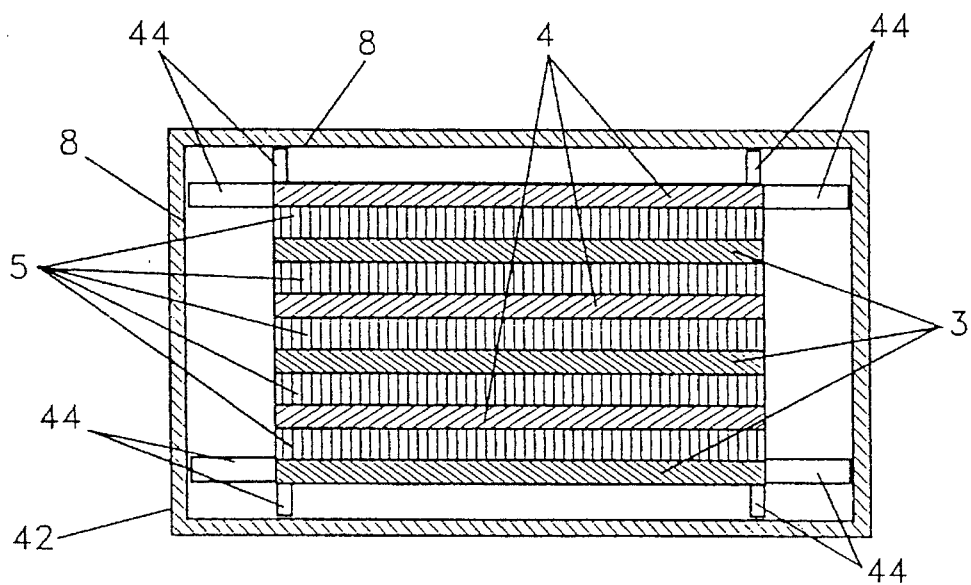
FIG. 6, a horizontal section through the battery cell of FIG. 5, taken on the line 6—6 of FIG. 5.
Figure 7:
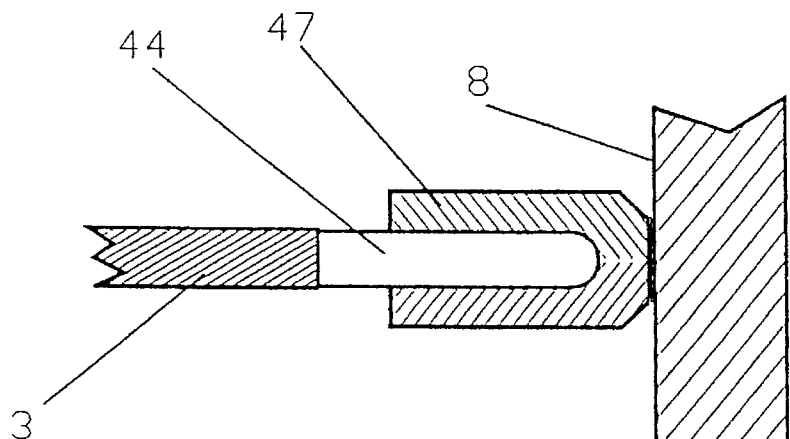
FIG. 7, an enlarged fragmentary horizontal section through an end portion of an outside electrode plate showing a spacer finger in plan view with a rubber cover in section.

FIG. 5 shows a battery cell 42 having a similar electrode package 2, as described earlier in connection with FIG. 2, containing a plurality of lead anode plates 3, FIG. 6, lead oxide cathode plates 4, and separator plates 5 between them, all tied firmly together as shown schematically by threads 6 to prevent any relative movements between the different plates during movement or vibration of the battery. As in the case of the stationary battery, the two poles or hangers 10 and 12 of the electrode package 2 extend upwardly through the top plate 13 of the battery casing and their horizontal arms 14 and 15 rest on cable terminals 16 and 17 and on rigid bar 28 that is supported on hinge 29 at one end and on load cell 30 at another point between the two poles 10 and 12. The mechanical contact between the rigid bar 28 and load cell 30 must be of a type that allows only transfer of the normal forces without transferring any lateral force components. In order to prevent upward movements of the electrode package 2, the rigid bar 28, and everything else that is attached to it, is pressed downwardly by compression spring 43 that is squeezed between bridge or battery case extension 22 and the upper surface of the rigid bar 28, preferably directly above load cell 30. To prevent any swinging or lateral movements of the electrode package 2 inside the battery cell 1, electrode package 2 is equipped with a number of spacer fingers 44 at two levels inside the battery cell, as shown in FIGS. 5 and 6. Spacer fingers 44 extend from electrode plate 3 at the side of the electrode package 2 where plate 3 forms a side of the package and extend from electrode plate 4 at the opposite side of electrode package 2 where plate 4 forms a side of the package. The fingers 4 extend from either plate 3 or 4 toward the cell walls 8 and, under normal circumstances when the battery is vertical, barely touch the walls without pushing against them. With this arrangement, the electrode package 2 is free to exert all of its weight force on the load cell 30 through the rigid bar 28, without any distortion due to friction with the cell walls. For a further improvement to eliminate any friction between the spacer fingers 44 and the cell walls, the spacer fingers may be covered with special rubber caps 47, as shown in FIG. 7 for a single spacer finger. The presence of a thin film of the electrolyte solution between the rubbery surface of the cover 47 and the cell walls 8 eliminates friction and prevents transfer of any vertical gravity force from the electrode package to the cell walls and yet, the electrode package is held securely in touch with the cell walls 8 to prevent any relative horizontal movements or impacts that could damage the electrodes. In a similar manner, the submerged density indicator body 32 must be secured against any vertical or lateral movements in the battery. As shown in FIG. 5, this is done by applying the force of a compression spring 48 on top of the horizontal arm 33a of the density indicator rod, holding it securely down over its load cell 31. For preventing any lateral movements of the density indicating body 32 inside the battery, the supporting rod 33 is extended below the indicator body 32 and passed through a hole in a console 49 that is fixed on the battery cell wall 8. The hole in console 49 is just large enough to allow the rod 33 to glide through it without friction, but with no additional gap around the rod. In this manner, the total sensible weight of the density indicator body will be transferred to the load cell 31 while the body is prevented from any vertical or horizontal movements.

The total force that is sensed by the load cell 30 will include a fixed component and a variable component. This can be expressed as $$F_T = F_c + F_v$$

in which $F_T$ is the total force or sensible weight sensed by the load cell 30, $F_c$ is the fixed component that is composed of all the dead-weights of the electrode package 2, the rigid bar 28, the connectors 18 and 19 and a constant force from spring 43, and $F_v$ is the variable component that will depend on the weights of the reactive masses on the anode 3 and cathode 4, and the changes of buoyancy due to the electrolyte density changes. Depending on the characteristics of the load cell 30, it may be necessary to include a correction factor for the microscopical vertical movements of the spring 43 as the electrodes go through a weight change. In this case, if K is the constant relating the spring force to its compression displacement, the above formula for the total force must be changed to the following:

$$F_T = F_c + F_v - Ke$$

Where e is the infinitesimal displacement of the lower end of the spring 43 under the effect of weight changes in the electrodes. The numerical value of e will depend on the characteristics (stiffness) of the load cell against vertical movements under load and it may be expressed as $e = (F_c + F_v)/S$, in which S represents the stiffness of the load cell 30. For a very stiff load cell e approaches zero but, in general $$F_T = (F_c + F_v)(1. - K/S)$$

The state of charge indication will be based on the variations in $F_v$ that can be calculated from the previous equation as:

$$F_v = [(F_T - F_c)(1. - K/S)]/(1. - K/S)$$

In this equation $F_T$ is measured by the load cell 30 while $F_c$, K, and S are known constants. By the same token, the total force that is measured by load cell 31 under the weight of the density indicator 32 and its attached rods will include a constant component from the fixed weights and the spring 48, plus a varying buoyancy (upward) force that depends on the instantaneous electrolyte density. This variable component will be combined electronically with the variable component of the gravity force measured by load cell 30, in calculating the actual or true weight of the reactive masses of the electrodes for assessing the state of charge in the battery.

Figure 8:
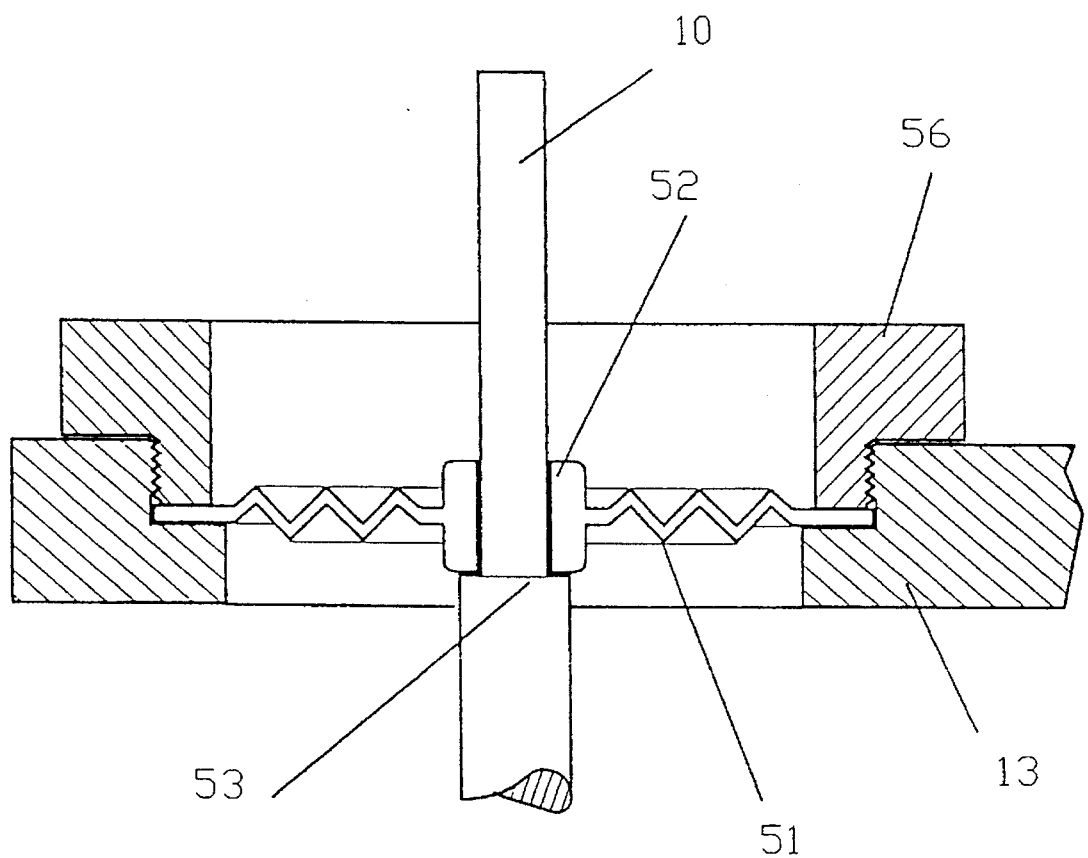
FIG. 8, an enlarged fragmentary section of the battery cap plate of FIG. 5 showing an electrolyte sealing membrane around a pole extending therethrough.

In order to seal the battery cells around the poles 10 and 12 for preventing any expulsion of the electrolyte during transportation, the gap 50 around each pole, 10 or 12, is sealed with a very flexible rubber diaphragm 51 with a wavy cross section for extra flexibility, as shown in FIG. 8. Referring to FIG. 8, diaphragm 51 has a central tall collar 52 that fits tightly around the pole 10 (the arrangement around pole 12 will be identical) at a special height above a slight enlargement 53 of the pole, and has a flat peripheral brim 54 that is pressed tightly inside a round cavity 55, concentric with the pole 10, in the upper surface of the battery top plate 13 with a threaded plastic ring 56. This arrangement seals the battery around the penetration holes of the poles without interfering with the measurement of electrode weight by the load cell.

Using a battery cell of the kind described above in an electric vehicle will subject the weight measuring devices to some abnormal gravitational forces due to acceleration or deceleration of the vehicle on slopes along the road. A similar phenomenon is observed in regular gas gauges in liquid fueled vehicles, as one may read too little or too much gas in the tank when the vehicle is ascending or descending an inclined road. Furthermore, the electrode package and the battery system, along with the whole vehicle, will be subject to some high frequency accelerations due to vibration, when driving on the roads. These vibrations will produce momentary errors in electrode weight measurement and hence in battery charge indication. But, as the vehicle stops these aberrations will disappear. These temporary aberrations in reading of the remaining charge may be ignored or, alternatively, some correcting arrangement can be employed as described in the following.

Figure 9:
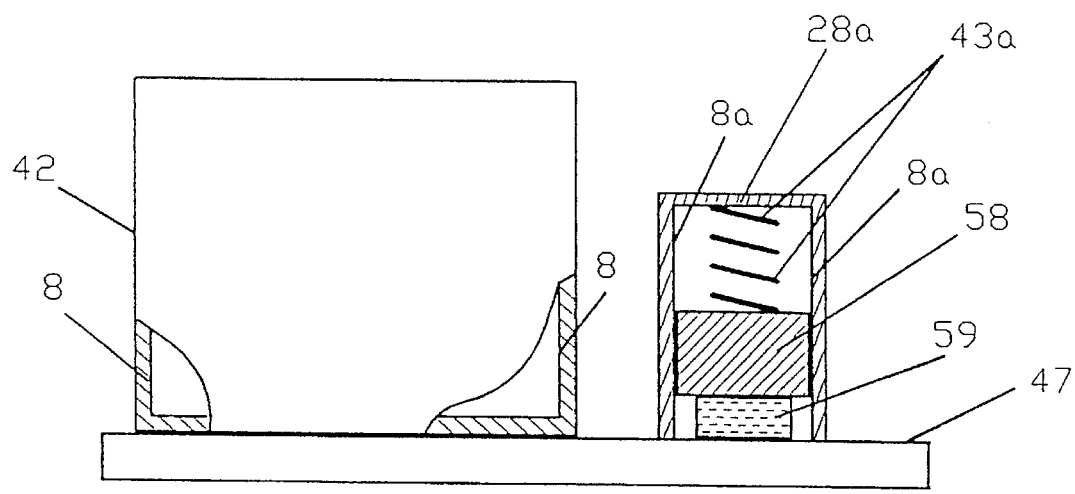
FIG. 9, a schematic, fragmentary vertical section of a correction apparatus used to correct measured battery electrode weight when the weight measurements are taken with the battery in a sloped position.
Figure 9A:
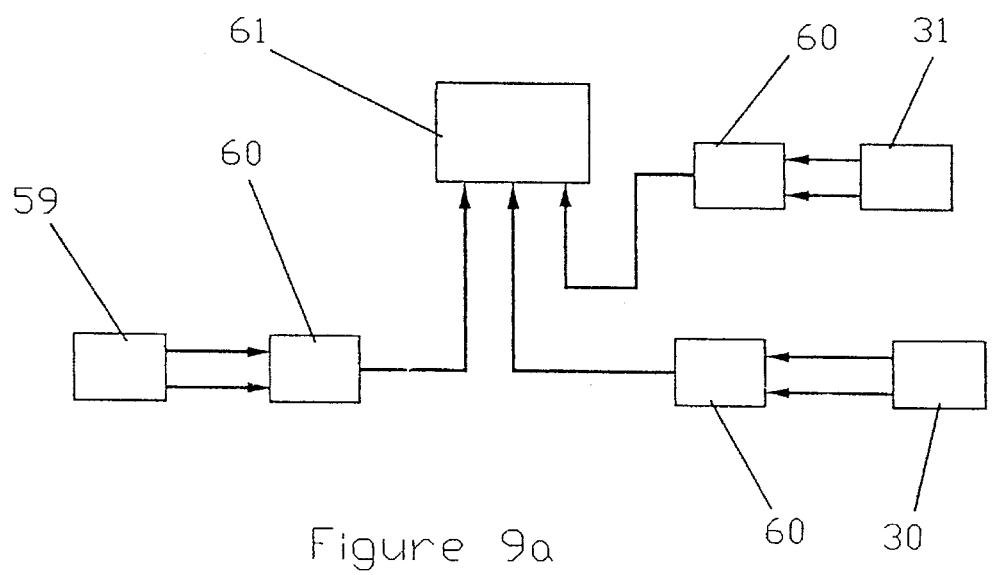
FIG. 9a, a schematic block diagram of measuring circuitry useful with the apparatus of FIG. 9.

Firstly, the effect of vehicle vibrations may be eliminated by electronically calculating the mean or time averaged values of the fluctuating signals that are obtained from weight measurements in the vibrating situation. There are straight forward mathematical procedures for time averaging, or so called filtering of data signals, that can be implemented on tiny integrated circuit (IC) chips for this purpose. Regarding the effects of gravity change due to the angle of inclination on the slopes along the road, one can employ a reference or correction signal from weight measurement by a similar load cell attached to a fixed reference mass that is mechanically affixed in the vicinity of the battery system and is surrounded by solid walls on four sides that are oriented in parallel with the inside walls of said battery cell 42. This is shown schematically in FIG. 9. A platform 47 supports the battery 42, the details of which were described in FIGS. 5 and 6, and adjacent to the battery, the platform supports a special container with four solid walls 8a that are vertically oriented in parallel with the inside walls 8 of the battery cell 42, the walls 8a housing a fixed mass 58 that is resting on top of a load cell 59 and is held constantly in that position with the force of a compression spring 43a that is suppressed under the top cover 28a of the housing. Mass 58 being preferably shaped as a cube with square sides is free to slide inside said walls 8a without friction but with very close clearance from the walls, and with all of its weight normally resting on load cell 59, when platform 57 is oriented completely horizontally. Whenever a fraction of the weight of electrode package 2 is transferred through spacer fingers 44 to battery walls 8 on a slope, an identical fraction of the weight of the reference mass 58 will also be transferred to one of its surrounding walls 8a due to being subjected to the same tilting as in the battery. The weight measuring signals from the reference load cell 59 is run first through a time averaging circuit, shown schematically as box 60 in FIG. 9a. The output of the time averaging circuit is then fed to a measuring and comparing circuit 61 along with the time averaged electrode weight and density weight measuring signals that are obtained from load cells 30 and 31. If the true weight of the reference mass 58 is $M_R$ and its instantaneous or sensible weight is measured to be $M_{RI}$, then the true weight of the electrodes, $M_E$, in that location is calculated as: $M_E=(M_R/M_{RI})M_{EI}$, in which $M_{EI}$ is the instantaneous or sensible weight of the electrodes. In this manner, the actual or true weight of the electrode package 2 is calculated accurately and related to the state of charge in the battery, regardless of the vehicle vibrations and changing slopes on the road. To facilitate manufacturing, the reference mass 58 may be cylindrical in shape. Housing walls 8a will also be cylindrical. The same determination of the ratio $M_R/M_{RI}$ will apply.

The above embodiments have been described in reference to a cell of a lead-acid battery. It should be noted that standard lead-acid batteries generally include a plurality of such cells built into a single battery with the cells connected in series to produce the desired voltage. A lead-acid battery cell generally produces two volts. For the twelve volt lead-acid battery generally used in automobiles, six individual cells are connected electrically in series to produce the desired twelve volts. In applying the invention to a lead-acid battery, said cell of the battery may include a sensible weight measuring apparatus in a form as described above or one or more cells can be measured and used as representative of other cells in the battery. However, this will assume that all cells are similar and will charge and discharge similarly, which is usually the case, and will not pick out a bad cell. For the most reliable charge indication, it is preferred that each cell have its own charge determination apparatus and that the measuring circuitry compare the charge of each cell in a battery to see that each has approximately the same charge. If one cell has a substantially lower charge content than the remaining cells, an alarm can be included to indicate a bad cell. Generally, a single display will be provided and the charge content of a cell indicated along with the particular cell for which the charge content is shown.

While the above described embodiments apply specifically to a lead-acid battery, similar embodiments can be applied to any other kind of rechargeable battery with a fluid electrolyte.

Concerning batteries with solid or gelled electrolytes, gelled electrode, and sealed primary (non-rechargeable) batteries, one can apply the same principle of relating the battery charge content to its electrodes' weight through the use of some parameter other than the actual measured weight of an electrode where such parameter is proportional to or otherwise indicative of the weight of or change in weight of one or both electrodes. Where battery electrodes are offset from the geometric center of a battery, changes in the weight of electrodes in the battery cause changes in the center of gravity of the battery. Apparatus that is sensitive to small displacements in the center of gravity of the battery may be used to indicate weight of the electrodes and thereby to indicate remaining battery charge.

Batteries of any kind may be designed such that the center of gravity of their electrodes, taken as a whole, will shift inside the battery as their electrodes react chemically to produce electricity, or as they react chemically when the battery is being recharged. A generic example of employing this basic principle is shown schematically in FIG. 10 in which a sealed battery 62 is designed such that its anode material 63 and its cathode material 64 are spaced apart at opposite sides of the battery container 65, with the electrolyte 66 and, if necessary, a separator 67 and membrane 68, filling the space between the electrodes. Obviously, the center of gravity of the whole battery in its fully charged state will have a position, such as indicated schematically, and for example only, by point 69a. The actual position of the center of gravity 69a when fully charged will depend on the chemical compositions of the anode 63, the cathode 64, and perhaps the electrolyte 66. But, as the battery's energy is consumed, the chemical compositions of the cathode and anode will change due to migration of some chemical elements from one electrode to another and this will cause a gradual shifting in the position of the center of gravity. In this example, we assume that initially the cathode 64 is heavier but, as the battery discharges it losses mass to the anode 63 and hence the center of gravity moves towards the anode 63, resting at a new point 69b when the battery is fully discharged. The gradual shifting of the battery's center of gravity can be measured with any desired accuracy by a number of different means. A simple and inexpensive balancing scale specifically designed for this purpose may be used.

Figure 10:
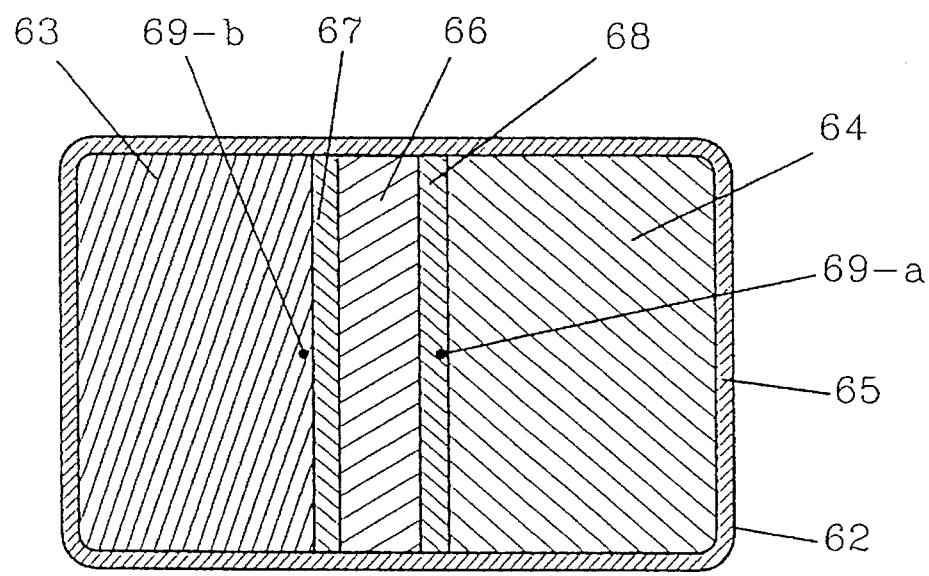
FIG. 10, a vertical section through a battery having respective electrodes at opposite ends thereof.
Figure 11:
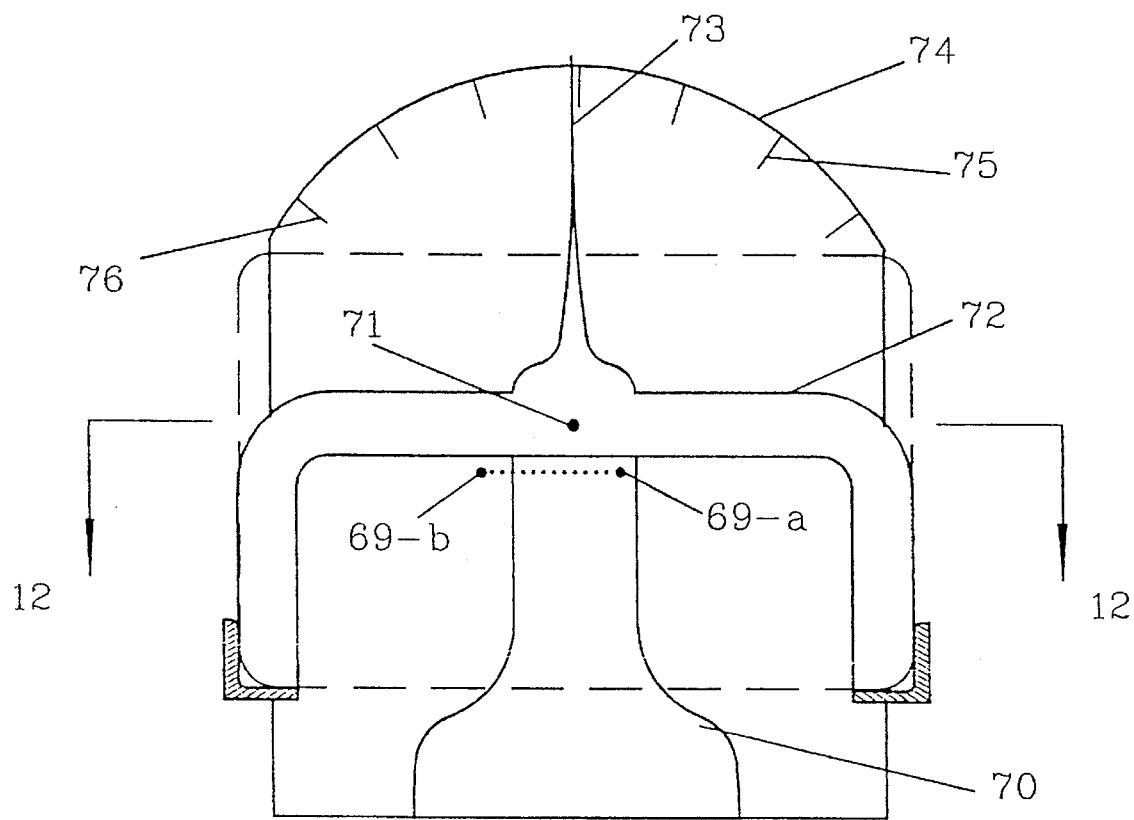
FIG. 11, a schematic representation of a balance type apparatus that can be used to measure the position of the center of gravity of a battery of the type shown in FIG. 10.
Figure 12:
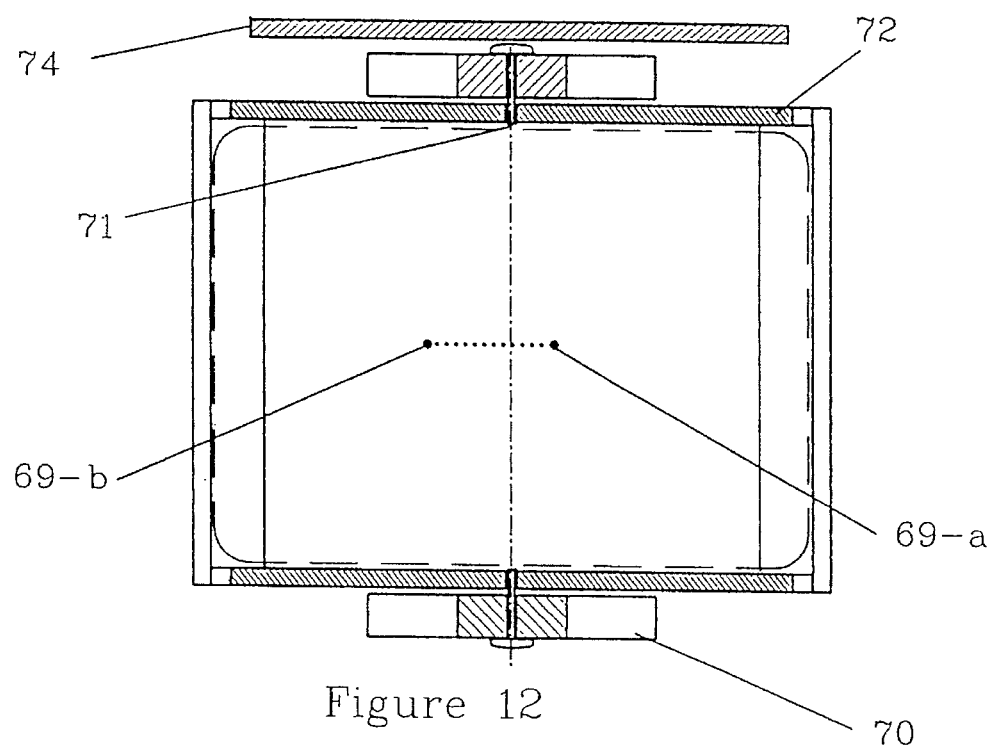
FIG. 12, a bottom view of the apparatus shown in FIG. 11.

FIG. 11 shows a balance scale with a base 70 and a balance arm 72 designed to mount or hold a battery therein, such as battery 62 shown in FIG. 10, such that its casing 65 is always held in the same position relative to the pivot axis 71 of the balance arm 72, and, preferably, maintain the line of movements of the battery's center of gravity, as defined by points 69a and 69b, slightly under the pivot axis 71 of the scale, and at a 90 degree angle with respect to said axis, as shown in FIG. 12. The scale 70 is also equipped with an indicator needle or pointer 73 that is affixed to the balance arm 72 and rotates with the arm in front of a specially graded indicator arc 74. When the fresh or fully charged battery 62 is placed in the balance arm 72 of the scale, the center of gravity 69a will be to the right of pivot axis 71 and hence the scale arm will tip down on the right side, making the indicator needle 73 rest at a certain position, such as 75, on the graded scale 74 that can be marked as the full-charge or "full" position. However, when the functionally discharged battery 62 is placed on the same scale, its new center of gravity 69b is on the left side of the pivoting axis 71 and hence the scale arms will tilt to the left and the indicator needle 73 will rest at another position, such as 76, on the graded surface, and this point can be marked as empty. The arc segment between points 75 and 76 can be divided in desired fractions and marked with numbers that correspond to the remaining fractions of charge in battery 62. Such an arrangement allows one to read the state-of-charge in a battery, such as battery 62, at any time by placing it in the balance arm 72 and observing the resting point of the indicator needle. A scale balance of this kind may be made to accommodate several different sizes of batteries and have a number of different grading marks aligned with the indicating needle for those different sizes.

Figure 13:
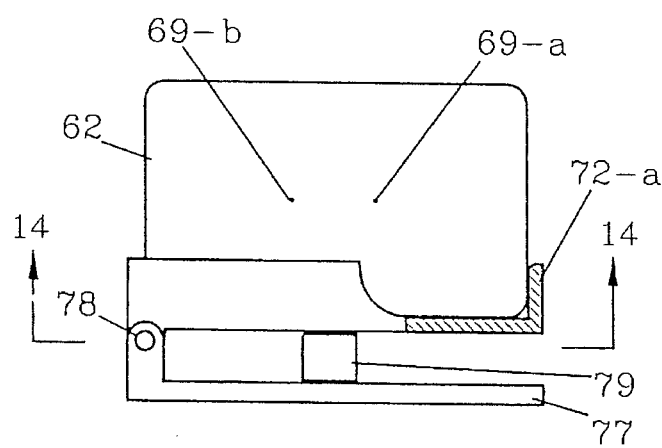
FIG. 13, a schematic representation of an apparatus using a load cell to measure the position of the center of gravity of a battery of the type shown in FIG. 10.
Figure 14:
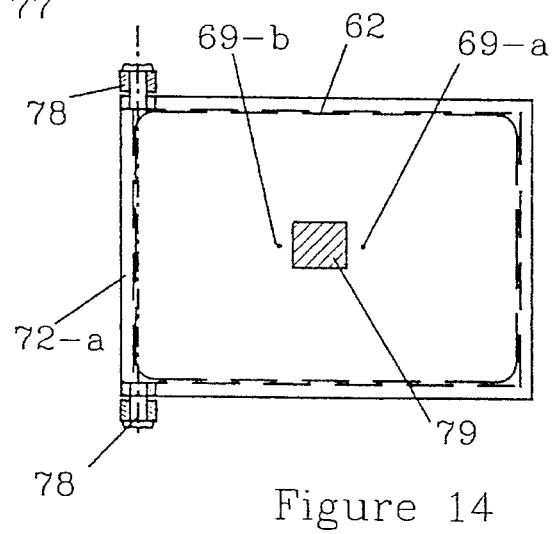
FIG. 14, a horizontal section taken on the line 14—14 of FIG. 13.

A more elaborate way of measuring the shifting of the center of gravity in a battery and that allows in situ reading of the weight shift and charge content, without removing the battery from its electric circuit, is shown in FIGS. 13 and 14 and uses a load cell or strain-gauge. FIGS. 13 and 14 show the battery 62 held firmly inside a tray 72a that provides electric contacts with suitably flexible cables to an external circuit, said tray being attached to a base plate 77 by a hinge 78 at one end of the battery such that the axis of said hinge is at a right angle to a line parallel with the direction of movement of the center of gravity in the battery, as defined by points 69a and 69b, and the main weight of the battery is carried by a load cell 79 that is placed under the battery 62 and above the said base plate 77, at a point midway between the positions of center of gravity, 69a and 69b, at fully charged and fully discharged states, respectively. The total weight of the battery will be distributed differently between the hinge 78 and the load cell 79, depending on the position of the center of gravity in the battery. The maximum load on the load cell 79 will be sensed when the battery 62 is fully charged and its center of gravity 69a is farthest from the hinge 78. But, as the battery discharges, its center of gravity moves gradually toward point 69b that is closer to the hinge 78 and hence, the load cell 79 senses successively a lesser part of the weight force, as more of the weight will be shifted to the hinge 78. The read-out of the load cell 79 may be calibrated in terms of the charge content of the battery 62. Rather than pivotally mounting the battery directly to the hinge means, a pivot arm could be pivotally secured to the base by the hinge and the battery mounted to the pivot arm.

If a device as shown in FIGS. 13 and 14 is employed in a vehicle, or in another moving object, it may be necessary to implement additional arrangements as described above in connection with the use of a lead-acid battery on a vehicle, for preventing vertical movements, for providing time averaging of the signals, and electronic comparison of the signal from the battery's load cell with similar signals from another load cell under a fixed mass.

In a variation of this embodiment, the hinge may be replaced by a second load cell. The respective percentage of the total weight of the battery measured by each load cell will change as the center of gravity of the battery shifts so the position of the center of gravity of the battery can be calculated from the two load cell signals. Also, additional load cells could be added for redundancy. The signals from the different load cells can be processed either separately or combined in the calculations to provide the read-out in terms of the charge in the battery.

Figure 15:
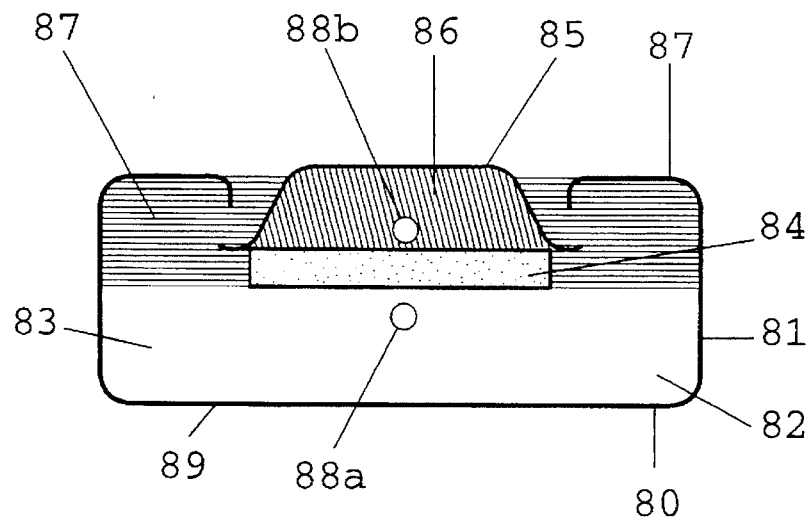
FIG. 15, a vertical section through a typical lithium/silver chromate battery.

The invention may also be practically applied in determining the state of charge of small lithium/silver chromate, or other kinds of miniature primary batteries that are used in a large variety of electronic devices. The existing configuration of many brands of these batteries lends itself to measurement of shifting of the center of gravity as the battery discharges. FIG. 15 shows a small lithium/silver chromate primary battery 80 that looks like a thick jacket-button. This battery is composed of a base casing 81 that contains the cathode chemical 82, a permeable barrier layer 83 and a separator 84. The top part of the casing 85 contains the lithium (Li) anode 86. The two parts of the casing 81 and 85 are sealed together through a non-conducting grommet 87. In the initial fresh state of the battery, the anode 86 is lithium, Li, and the cathode is silver chromate, $Ag_2CrO_4$. The center of gravity 88a for the whole battery will be closer to the bottom surface 89 of the battery, because of the cathode's heavier mass compared to the Lithium anode 86 in the top. But, when the battery is discharged, the cathode 82 will contain mainly silver, while the anode 86 will contain a considerable amount of lithium chromate that is a much heavier compound and hence, the center of gravity of the whole battery will be moved to a new point 88b, away from the cathode 82 in the bottom and closer to the anode 86 at the top. This feature lends itself to applying the present invention for measuring the state of charge in these batteries. Several other types of miniature primary batteries with similar appearance, though using different materials and chemical reactions, will also exhibit a shift in center of gravity similar to that explained above. In such cases, the shifting in the battery's center of gravity is measured and calibrated in terms of the remaining charge in the battery.

Figure 16:
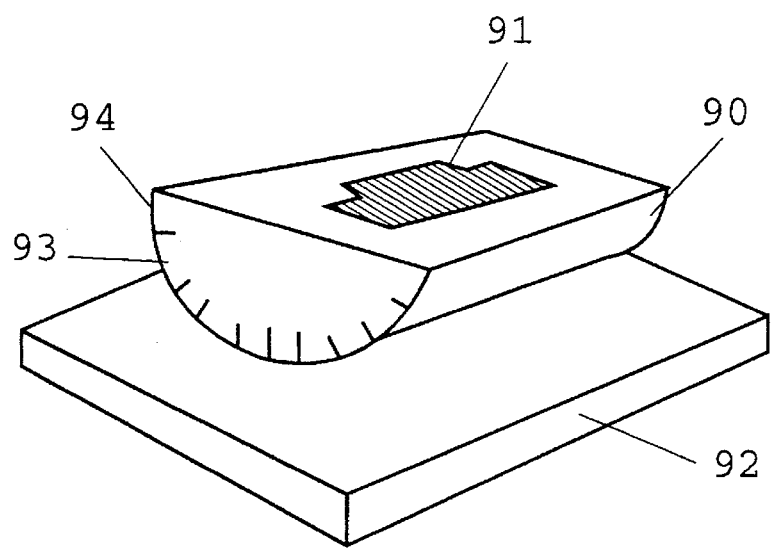
FIG. 16, a perspective view of another embodiment of measuring device of the invention.
Figure 17:
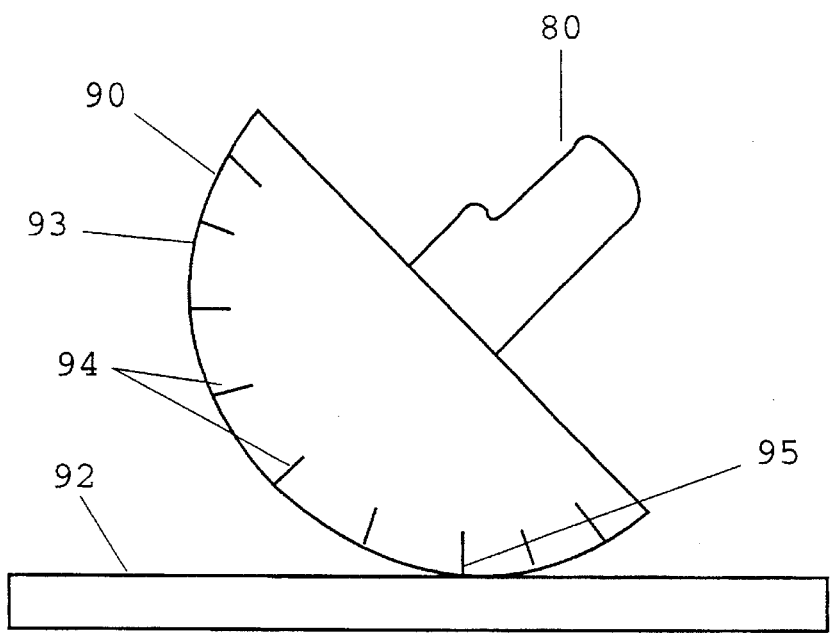
FIG. 17, a side elevation of the device of FIG. 16 with a battery therein.
Figure 17A:
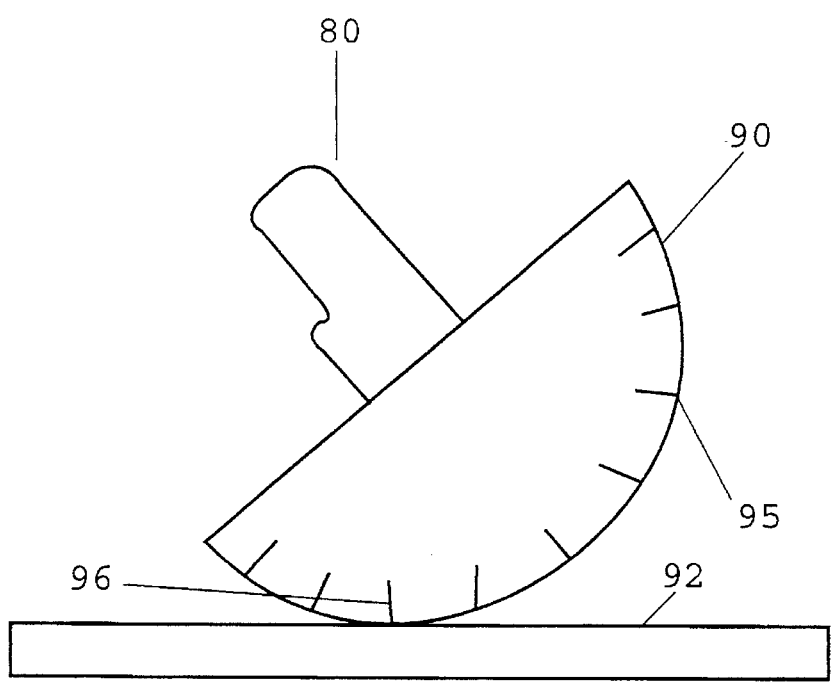
FIG. 17a, a side elevation similar to that of FIG. 17, but in a different position.

A device particularly suited for measuring the shift in the center of gravity of the small button-type batteries is shown in FIGS. 16 and 17 and includes a half-cylindrical body 90, made of a light-weight material or as a hollow shell, with a cavity 91 in its mid-length that is contoured to hold the battery 80 in a mainly upright position and in a certain orientation that always makes the anode part 86 be facing in one direction and its base plate 89 facing the opposite direction. Putting the cylindrical body 90 on a flat horizontal surface 92 and placing the battery 80 in cavity 91 makes the cylindrical body role to one side or the other, depending on the location of the center of gravity inside the battery. The cylindrical body stops rolling at a position that balances the gravity force on the battery's center of gravity with the effect of gravity on the rest of the cylinder. If the battery is fresh, its center of gravity 88a is close to the bottom plate 89, which causes the cylindrical body 90 to tilt to the right, as shown in FIG. 17. However, if the battery is discharged, its new center of gravity 88b has moved closer to the anode part 86 and this makes the cylindrical body tilt to the left, as shown in FIG. 17a. The end-surface 93 of the cylindrical body 90 can be marked or graded with short radial line segments 94 and the line 95 that points vertically down toward the horizontal surface 92, when the battery 80 is fresh and fully charged, can be marked as full-charge and another line 96, which will be pointing vertically down when the battery is fully depleted as shown in FIG. 17a, may be marked empty or depleted. The other radial line segments between the fully charged and depleted markings can be graded in a calibration process, according to the percentage of charge left in the battery. This graded cylinder can then be used to measure the remaining charge in any other battery of this kind and size. The rotation of body 90 may be linear from fully charged to functionally discharged condition of the battery, or may be non-linear depending upon a number of factors such as the type of battery and its positioning in the body. However, the calibration can take this into account.

Figure 18:
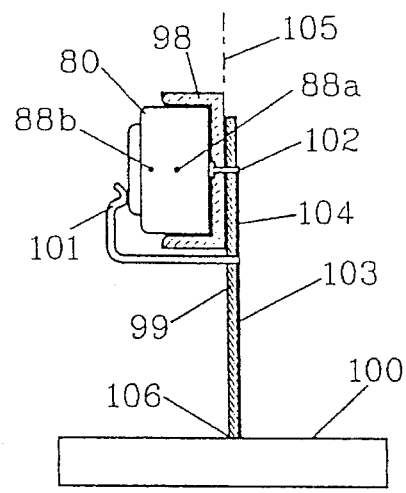
FIG. 18, a side elevation of another embodiment of measuring device of the invention.
Figure 18A:
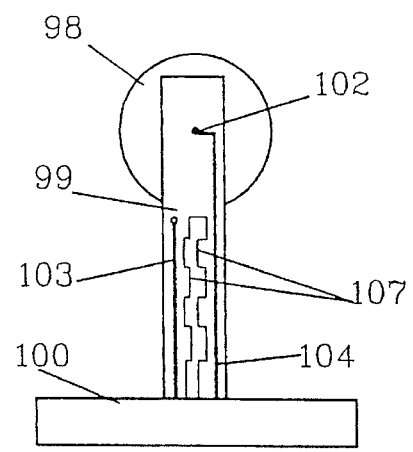
FIG. 18a, a back elevation of the device of FIG. 18 looking from the left in FIG. 18.

In some cases it may be necessary to monitor the remaining charge of a small lithium battery 80 without disconnecting it from its electrical circuit. FIG. 18 shows an arrangement for measuring the shifting of the center of gravity of the battery 80 while maintaining its electrical contacts in a battery circuit. In this embodiment, the battery 80 is placed in a holder 98 that is supported in an upright position on a flexible strip 99 of a non-conducting material that is fixed vertically on a base 100. The electrical contacts 101 and 102 to the anode and cathode of the battery are provided through thin-film metallic traces or runs 103 and 104, shown in FIG. 18a, that are affixed on the flexible strip 99. The position of the holder 98 on the flexible strip 99 is such that when the battery is fresh or fully charged its center of gravity 88a will be very close to a normal vertical line 105 that passes through the base point 106, as shown in FIG. 18, but when the battery is depleted or functionally discharged its center of gravity 88b will be a little farther away from the normal line 105, as indicated in FIG. 18. In this arrangement, any shifting in the battery's center of gravity inside its housing 98 will induce a change in the bending torque that the battery and its housing exert on the flexible strip 99. Strip 99 is equipped with a tiny strain-gauge 107 on its backside, as shown in FIG. 18a, and the strain-gauge is electrically connected to an appurtenant resistance bridge and electronic circuitry for detecting variations in the bending stress on strip 99. As the bending torque changes in strip 99, due to any shifting in the battery's center of gravity, strain-gauge 107 will detect the changes and its electronic read-out may be calibrated to indicate the state of charge in battery 80.

Figure 19:
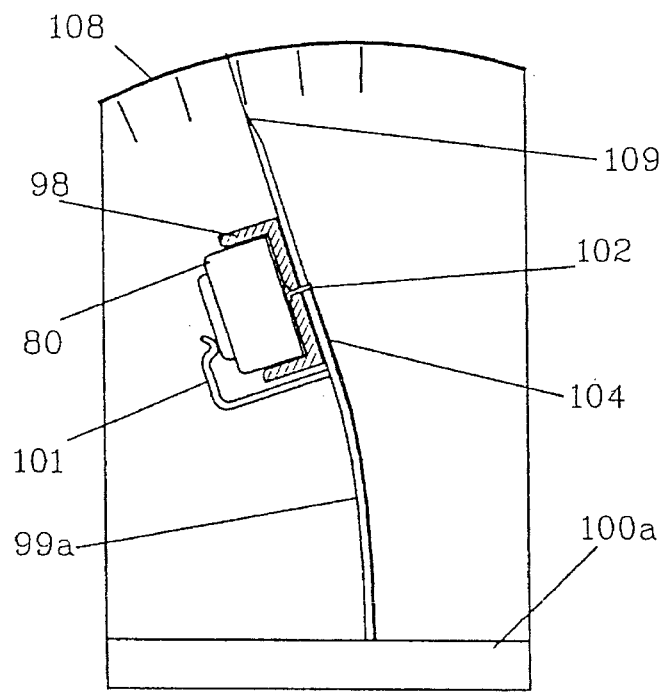
FIG. 19, a side elevation of a further embodiment of the invention.
Figure 19A:
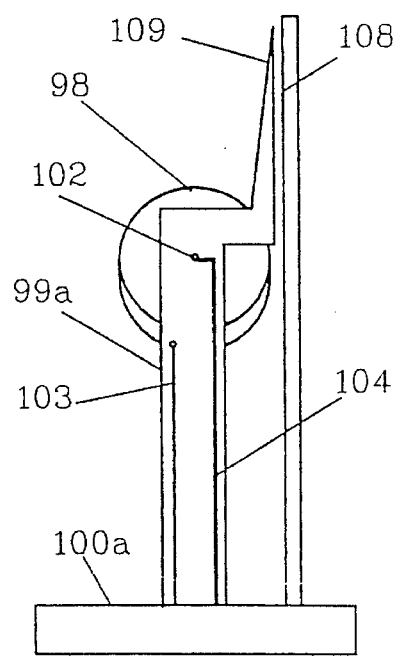
FIG. 19a, a back elevation of the device of FIG. 19 looking from the left in FIG. 19, but showing the flexible member in substantially straight condition.
Figure 20:
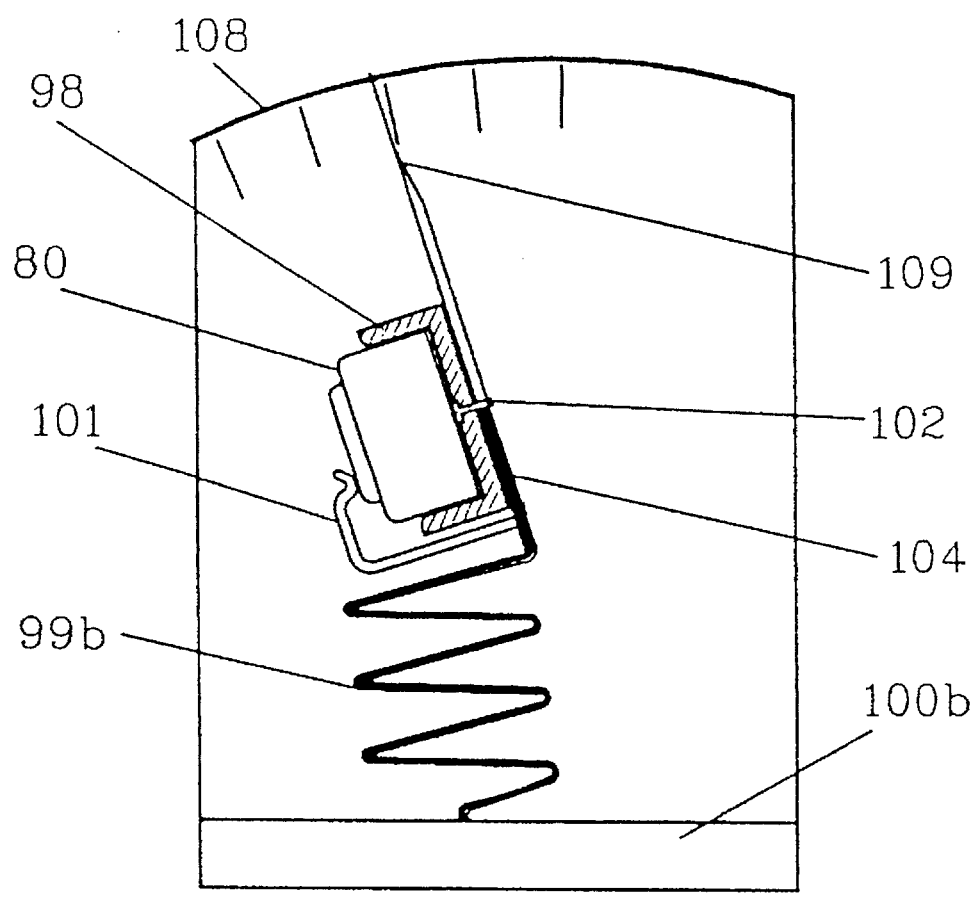
FIG. 20, a side elevation of a still further embodiment of the invention.

An inexpensive, visual version of this in situ charge measurement device can be made by leaving out the strain-gauge and using a longer or more flexible strip 99a of mylar or the like with only the conducting runs 103 and 104 on them, as shown in FIGS. 19 and 19a. As indicated in FIG. 19, with the battery 80 mounted in its housing 98, this flexible strip will bend visibly to an extent that depends on the position of the center of gravity inside the battery 80, and a graded reading dial 108 can be positioned adjacent the strip against which the bending of strip 99a can be visually measured by a pointer 109 attached to the tip of strip 99a. The gradation are calibrated to provide readings of the charge content in battery 80. For increased sensitivity inside a limited space, one can use a coiled or serpent-like bent strip of flexible material, instead of a long straight piece. This is shown schematically in FIG. 20 in which the battery 80 and its housing 98 are supported on a curved strip 99b that is attached firmly at its end to a fixed base 100b. The increased length of the bent strip in this case allows larger movements of the housing for the sifting of the center of gravity in the battery. Obviously, one may use a bracing or cushioning mechanism for holding the small battery 80 and its housing 98 in a firm position, to prevent unnecessary vibrations and mechanical damage for all times between subsequent readings of the state of charge, but release them to be free and exert bending torque on the supporting strip 99, 99a, or 99b, when a new reading of the state-of-charge is needed. This embodiment, either with or without the strain-gauge, could be incorporated in the designs of many electronic equipments that use these kinds of batteries, and would provide a very useful means for battery charge monitoring.

Figure 21:
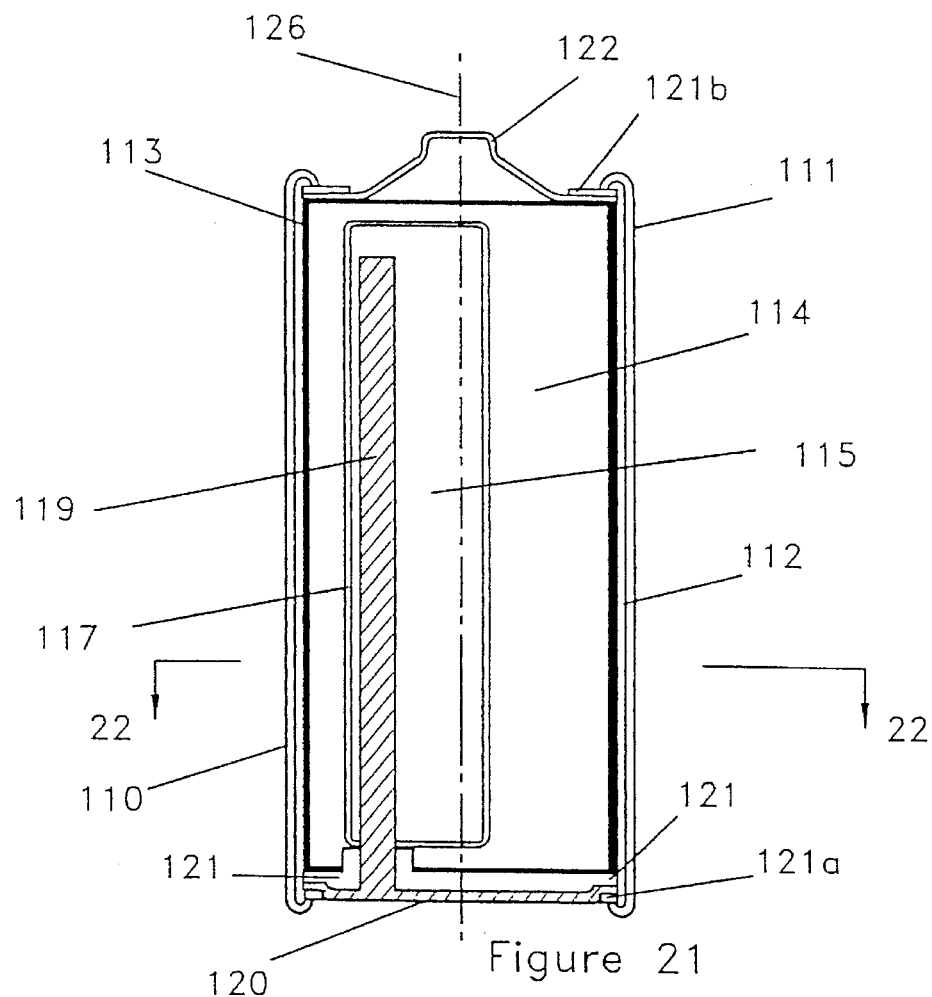
FIG. 21, a schematic vertical section of a new dry cell battery construction of the invention.
Figure 22:
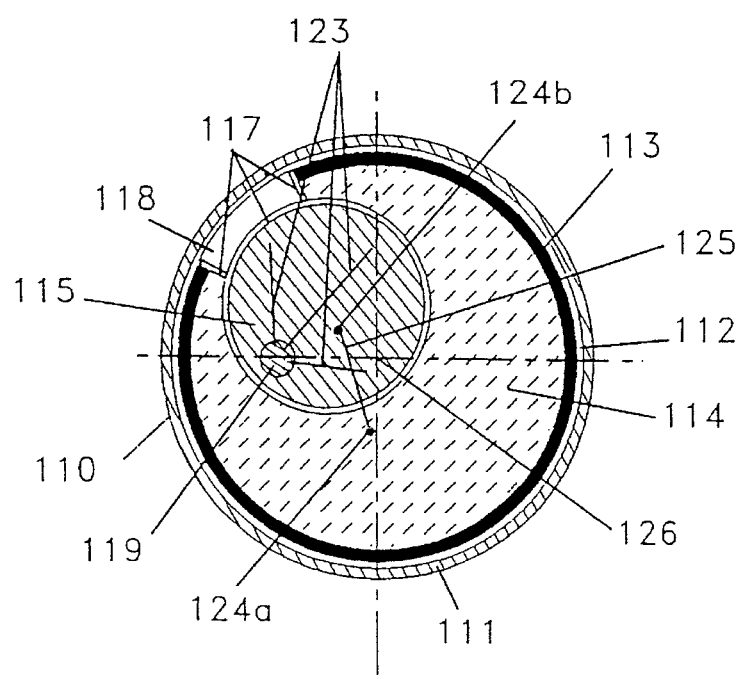
FIG. 22, a horizontal section taken on the line 22—22 of FIG. 21.

So called dry cell primary batteries are widely used in flashlights, toys, and many household products. These batteries are made in standard sizes known as AAA, AA, A, B, C, and D, etc. Such batteries may be composed of a zinc anode, a cathode of manganese dioxide mixed with an electrolyte of either ammonium chloride solution, or of zinc chloride solution, and some additional materials for added conductivity and for giving the cathode mixture a paste-like consistency. The cathode mixture is separated from the zinc anode by a layer of permeable but nonconducting separator separating material, and the electricity on the cathode side is conducted out through a central conducting carbon rod. Usually, the zinc anode is made in the form of a cylindrical can that contains all the other components. Another class of batteries with the same standard appearances are made with an anode of zinc powder and a cathode of one or more oxygen-rich chemicals such as manganese dioxide mixed with a solution of sodium or potassium hydroxide that acts as the electrolyte. The cathode mixture in these batteries is contained in a cylindrical casing of conductive carbon that is encased inside a metallic jacket. A layer of permeable separator material separates the cathode/electrolyte mix from the central mass of zinc powder and a central pole of brass leads to a metallic disk in the bottom, which is the anode contact and is electrically insulated from the cylindrical casings. These are known as alkaline batteries and are preferred for some applications. Presently, all of the dry cells of the sizes AAA through D are made of cylindrically concentric elements, and for this reason the chemical reactions that take place in these batteries, i.e., oxidation of the zinc anode, while producing electricity, and a change in weight of the anode and electrolyte, do not result in a measurable change in their center of gravity, as the center of gravity always coincides with the cylindrical axis of the battery. However, with some modifications in design of such batteries to change the initial distribution of the materials, namely the zinc anode and the cathode mixture inside these batteries, it will be easy to detect their charge content at any time, as they are used. The modified construction is described below and illustrated in FIGS. 21 and 22 in reference to alkaline-type battery, but the same construction applies equally to other dry cell battery types. FIGS. 21 and 22 show a cylindrical battery 110 that is composed of an outer steel jacket 111 with an inner lining 112 of an insulating material inside of which is a thin cylindrical shell 113 of conductive carbon. The outside dimensions of the cylindrical jacket 111 are the same as those of any standard dry cells size AAA through D, so these new batteries can be used interchangeably with the existing batteries of this kind in any system. However, the inside distribution of the cathode mixture 114 and the zinc-powder anode 115 are made eccentric such that the zinc-powder anode 115 is mainly concentrated on one side of the battery's cylindrical axis 126 while the cathode mixture 114 that surrounds the separator 117 and the zinc anode 115, is distributed unsymmetrically inside the battery casing. A hollow longitudinal cavity 118 is provided between the anode mass 115 and the insulating layer 112 next to the cylindrical casing 111. The cavity 118 may be completely empty, or filled with a prefabricated insert made of a very low density porous and shrinkable material that can yield when the anode zinc mass expands in that direction. The purpose of this cavity is to make that side of the circular casing lighter in weight compared to its diagonally opposite side to concentrate the weight distribution more in the lower half of the circular cross section to maintain the battery's center of gravity slightly below the center of the casing. Another purpose of cavity 118 is to collect the gases that evolve from the reactions inside the cathode mass, as is currently done in all alkaline batteries and also, provide an expansion space for the zinc anode mass 115 as its volume increases due to oxidation when electricity is drawn from the battery. The particular positioning of the cavity 118 close to the battery casing is for amplifying the effects of anode oxidation on shifting the position of gravity center, as the anode oxidizes and expands. The cross sectional area of the cavity should be at least about 10% of the cross sectional area of the zinc anode material.

As shown in FIG. 21, the zinc anode 115 surrounds a metallic, such as zinc, current collector 119 that leads to the metallic anode cap 120 at the bottom, which is separated from the cathode collector 113 by an insulator 121 and it is also separated from the steel jacket 111 by an insulating ring 121a. The carbon cathode collector 113 is electrically connected to the cathode cap 122 at the top, and the cathode cap is electrically insulated from the steel jacket 111 by insulating washer 121b. The anode current collector 119 is purposely placed eccentrically inside the zinc powder mass to contribute to a lopsided mass distribution in the circular cross section, and it is equipped with fins 123 that extend into zinc-powder mass 115 to increase conductivity. In all other aspects and necessary details for such cells, the present design will be identical to existing batteries of this kind.

Figure 23A:
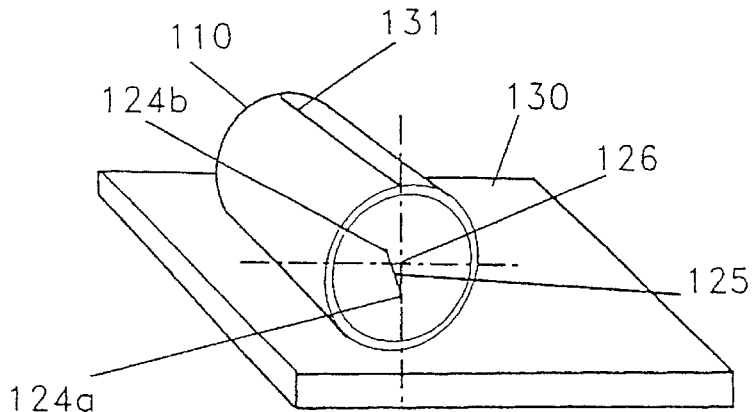
FIG. 23a, a perspective view of the battery of FIGS. 21 and 22 placed on its side on a flat surface and free to roll thereon, showing the battery at rest in one position.
Figure 23B:
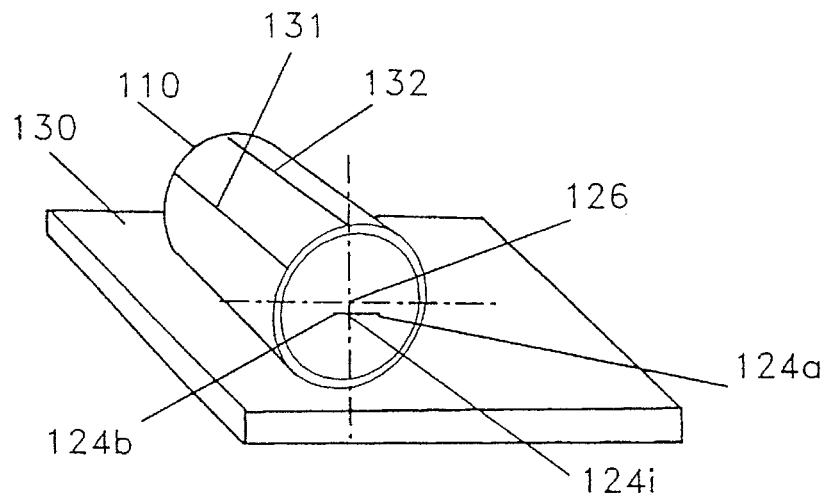
FIG. 23b, a view similar to that of FIG. 23a, but showing the battery at rest at a second position.
Figure 23C:
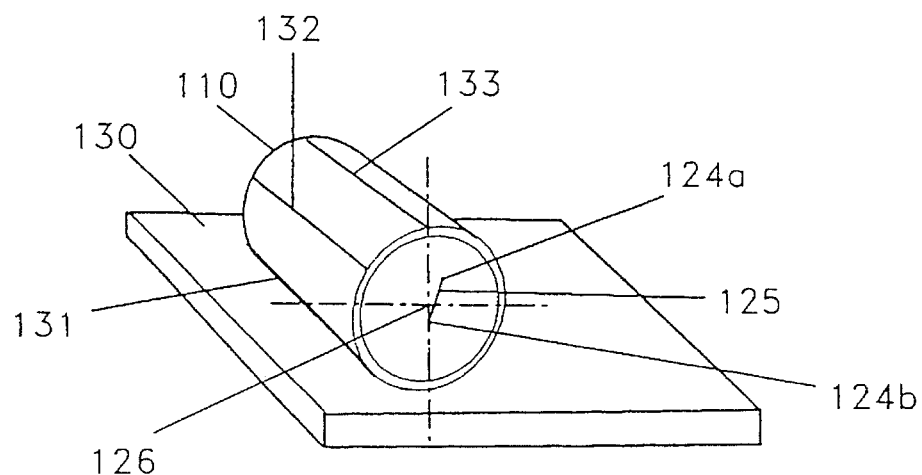
FIG. 23c, a view similar to that of FIG. 23a, but showing the battery at rest at a third position.

It is evident from FIG. 22 that the center of gravity of the battery will move principally along a hypothetical line 125 that is defined by points 124a representing the center of gravity when the battery is fresh, and 124b representing the center of gravity when the battery is depleted and a major part of the zinc powder has been oxidized. The two points 124a and 124b may lie on opposite sides of cylindrical axis 126, or, in some variations of this design, they may both lie on the same side of axis 126, but their distance from the axis will be different. In any case, placing battery 110 horizontally on its side on a horizontal flat surface as shown in FIGS. 23a, 23b, and 23c will make the battery roll until its center of gravity reaches its lowest possible height above the horizontal surface. This means that the battery will balance on different points along its circular circumference depending on its charge content. To illustrate this, we consider three different states of charge in the battery 110, as depicted in FIGS. 23a, 23b, and 23c. FIG. 23a shows a fresh battery 110 rolled on a smooth horizontal flat surface 130 until balancing at a point such that its center of gravity 124a comes to rest along a local normal vertical line that passes through point 126, representing the center of the circular cross section of its casing. The generatrix line of the cylindrical casing 131 that comes on top of the casing in this position may be marked "FRESH" or "CHARGED", or painted with a certain color, for example green, that identifies this state of charge in the battery. FIG. 23b shows the same battery 110 in an intermediate state, when some of its energy has been used. After rolling on a smooth horizontal flat surface 130, the battery will balance at a new point along its periphery such that its new center of gravity 124i comes to rest along a local normal vertical line that passes through the center of the circular cross section. The generatrix line 132 of the cylindrical casing that comes on top of the casing in this position may be marked with a percentage number corresponding to the remaining charge in the battery, or it may be painted with a different color, for example yellow or orange, to identify this state of charge in the battery. Finally, FIG. 23c shows the battery 110 in its depleted state coming to rest on the flat surface with its final center of gravity 124b resting vertically under the center of its circular casing. The cylindrical generatrix line 133 that comes on top in this situation can be marked "DEPLETED", or painted with a red or black color. Obviously, the generatrix lines between "FRESH" and "DEPLETED" may be marked with different percentage numbers that are calibrated with the charge content of the battery corresponding to the stages that brings each one of those lines on top. This battery would then be self contained regarding its state of charge indicator. Just by putting this battery on a horizontal flat surface and letting it role, it would turn and come to rest at a position that displays its state of charge on the top line of its casing.

The rotation torque in the cylindrical dry cells that depends on the position of the battery's center of gravity can also be measured by a variety of devices similar to those described earlier, such as by mechanical rolling scales, or with the use of a strain-gauge attached to a holder for these batteries. It should only be mentioned that in situ, under load, state of charge measurement can be performed for one or a number of these batteries in an arrangement that holds the batteries in the same orientation with a certain marked generatrix or specifically designed notch on the battery's periphery always appearing under a designated point in the holder.

It is interesting to note that measurement of voltage of a dry cell can be very misleading as to the extent of charge left in such a battery. This is due to the very low voltages that may be shown by a relatively fresh battery, just after a short spell of drawing an intensive current from it. In the course of chemical reactions in these batteries, some gases are produced inside their cathode mass and collection of those gases around the carbon collector produces a temporary blockage leading to low voltage indication. The state of charge indication according to the present invention, as described above, would not be affected by such a blockage of the carbon collector and it would still show the correct amount of charge left in the battery. Usually, when the battery is left free of electric loads for a while, it recovers as the gasses diffuse into the atmosphere or into the specifically built in gas collector space.

Figure 24:
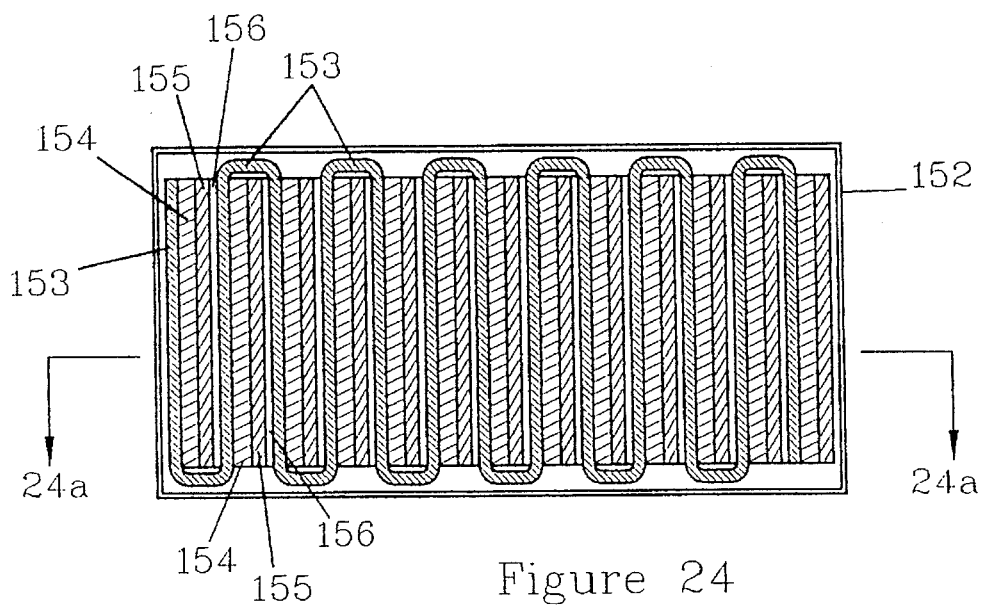
FIG. 24, a schematic vertical section of another battery construction of the invention.
Figure 24A:
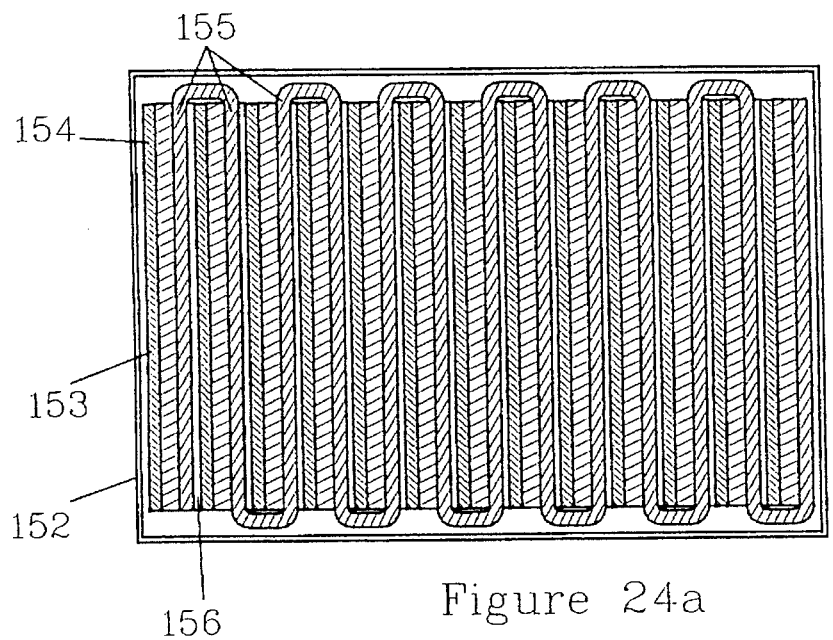
FIG. 24a, a schematic horizontal section of another battery construction of the invention.

For some industrial applications, many batteries have to be made of a multitude of plates or foils of anode and cathode that are pair-wise separated from each other by a layer of electrolyte. The principle of charge content indication by measuring the shift of battery's center of gravity can also be applied to such batteries. FIG. 24a and 24b show a schematic vertical and horizontal sections of a battery 152 with repeated layers of electrode pairs, each containing an anode layer 153, an electrolyte layer 154, and a cathode layer 155. It is essential to design a multi-layered battery of this kind such that transfer of chemical components from one set of electrodes to the opposing set, or to the electrolyte layers, during the discharging reaction will take place all in the same geometrical direction and the direction of material transfer during a recharging process will be all in the reverse geometrical direction. This feature can be easily built in such batteries by employing a thin layer of electrically insulating material 156 between each pair of adjacent cathode and anode layers 153 and 155, as shown in FIGS. 24a and 24b. With this feature built into battery 152, the position of its center of gravity will be uniquely dependent on its charge content. Variations of the center of gravity in this battery can be measured by any of the above mentioned approaches and related to the state of charge in the battery.

Figure 25:
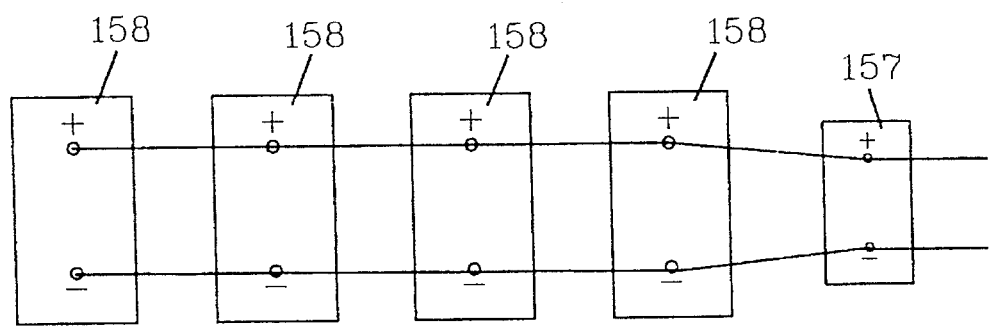
FIG. 25, a schematic representation of several individual batteries connected in series, one of the batteries having a state-of-charge detector according to the invention.

Finally, as shown in FIG. 25, one can use the present invention in the form of a pilot battery cell 157 that is equipped with one of the described embodiments for in situ charge indication, and connect said battery electrically in parallel with a number of existing batteries 158 of the same chemical composition, but without a state of charge indicator, and use the readings of the fractional state of charge in this pilot cell to estimate the state of charge in the whole set of the connected batteries. This arrangement will be most suitable for use on batteries whose voltage has some dependence on the remaining charge in the battery, as this feature will always tend to equalize the fractional remaining charge between the different individual batteries that are connected in parallel.

Figure 26:
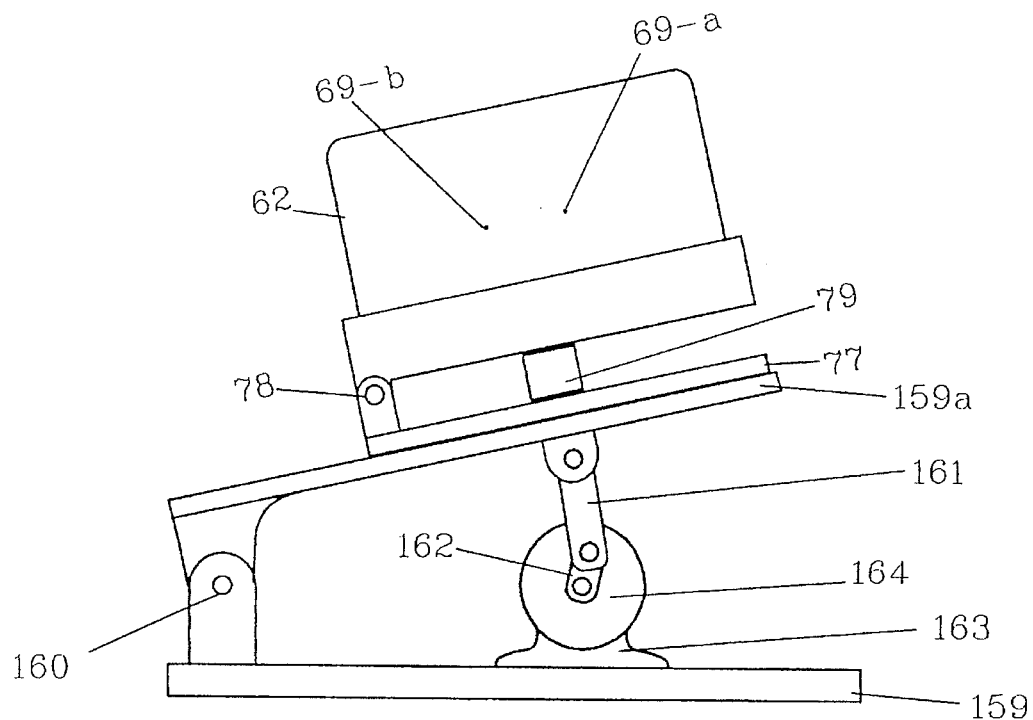
FIG. 26, a further embodiment of a measuring device of the invention.

In most of the embodiments described above, the effect of gravitational acceleration may be replaced by an artificially induced acceleration. Such a replacement may be needed only in very rare occasions, such as in a weightless environment. FIG. 26 shows an arrangement that in most parts is identical with that of FIGS. 13 and 14, in which a battery 62 is attached to a base plate 77 via a long hinge 78 at one end of the battery and a load cell 79 at a location midway between the extreme positions of the center of gravity, 69a and 69b. Base plate 77 is attached to a support platform 159a which is pivotally secured to a foundation 159 through a hinge 160 and the oscillating arm 161 of the rotating handle 162 of a cranking arrangement 163. The cranking arrangement is driven by a rotary motor 164 and as a result, the support platform 159a and the base plate 77 will oscillate or vibrate with everything else attached to it with respect to foundation 159. This vibration will create an oscillating acceleration with a regular pattern of positive and negative half cycles. An average acceleration may be calculated for only the positive half cycles or components of acceleration, and eliminating the negative half cycles or components of acceleration by using an electronic time-averaging process that was alluded to earlier in connection with the use of a lead-acid battery on a moving vehicle. Also, with reference to that same embodiment, a similar arrangement for a reference mass with its housing walls and its own load cell and time-averaging signals for the positive acceleration half cycles will be mounted on the base plate 77 in this configuration. Electronic combination of the time averaged signals from the load cell 77 and the signal from the reference mass will provide indications of any displacement of the center of gravity in the battery 62, even in the weightless environment. As indicated, the measured displacements in the center of gravity can be related to the state of charge in the battery.

The battery charge indication according to the present invention should be used in combination with any of the existing methods of state-of-charge indication that are based on sensing the electric signals of the battery. Combination of two independent measuring techniques may, in some cases, provide a more accurate determination of the state-of-charge in a battery.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Apparatus for determining the charge of a battery of a type which generates electricity through the reaction of a battery electrode with an electrolyte which causes a change in the chemical composition of the electrode and therefore a change in the weight and density of the electrode as the charge of the battery changes, comprising:

means for measuring the value of a parameter indicative of the weight of a battery electrode at a time when it is desired to measure the charge remaining in the battery; and means relating the value of the measured parameter indicative of the weight of the electrode to the value of that parameter indicating a weight of the electrode when the battery is fully charged and a value of that parameter indicating a weight of the electrode when the battery is functionally discharged to determine the charge of the battery.

2. Apparatus for determining the charge of a battery according to claim 1, wherein the parameter measured is the weight of the electrode.

3. Apparatus for determining the charge of a battery according to claim 1, wherein the parameter measured is indicative of the position of the center of gravity of the battery.

4. Apparatus for determining the charge of a battery according to claim 1, wherein the battery has an electrode of one polarity and an electrode of opposite polarity, and wherein the parameter measured is a relative change in the weight of the electrode of one polarity in relation to the weight of the electrode of opposite polarity.

5. Apparatus for determining the charge of a battery according to claim 1, wherein the means for measuring the value of a parameter produces an electrical signal representative of the value of the measured parameter, and the means relating the value of the measured parameter is electronic circuitry including a microprocessor and a visual output which displays the relationship of the measured parameter value to the value of the parameter when the battery is fully charged and the value of the parameter when the battery is functionally discharged.

6. Apparatus for measuring the charge of a battery of the type which generates electricity through the reaction of a battery electrode with an electrolyte which causes a change in the chemical composition of the electrode and therefore a change in the weight and density of the electrode as the charge of the battery changes, and wherein the electrolyte is a liquid, comprising:

means for suspending at least one battery electrode in the battery electrolyte, said at least one electrode having a weight when the battery is fully charged and a different weight when the battery is functionally discharged;

means for measuring the weight of the at least one suspended battery electrode; and means for relating the measured weight to the weight of the at least one electrode when the battery is fully charged and the weight of the at least one electrode when the battery is functionally discharged to thereby provide an indication of the amount of charge remaining in the battery.

7. Apparatus for determining the charge of a battery according to claim 6, wherein the battery includes a set of electrodes of one polarity and a set of electrodes of opposite polarity, wherein each set of electrodes has a true weight and a sensible weight, the sensible weight being the difference between the true weight of a set of electrodes and the buoyancy force of the electrolyte acting on the set of electrodes; and wherein the parameter measured is the sensible weight of one set of electrodes.

8. Apparatus for determining the charge of a battery according to claim 7, wherein two parameters are measured, and wherein the two parameters measured are the separate sensible weights of each set of electrodes.

9. Apparatus for determining the charge of a battery according to claim 7, wherein the parameter measured is the combined sensible weights of both sets of electrodes.

10. Apparatus for determining the charge of a battery according to claim 6, wherein the suspended at least one electrode has a true weight and a sensible weight, the sensible weight being the difference between the true weight of the at least one electrode and the buoyancy force of the electrolyte acting on the at least one electrode; wherein the means for measuring the weight of the suspended at least one battery electrode measures the sensible weight of the at least one electrode and is a load cell.

11. Apparatus for determining the charge of a battery according to claim 10, wherein the load cell outputs an electrical signal indicative of the sensible weight of the at least one electrode.

12. Apparatus for determining the charge of a battery according to claim 10, wherein the load cell is hydraulic and has fluid therein having a pressure, and wherein the pressure of the fluid in the load cell is indicative of the sensible weight of the at least one electrode.

13. Apparatus for determining the charge of a battery according to claim 12, wherein the means for relating the measured weight of the at least one electrode to the weight of the at least one electrode when the battery is fully charged and the weight of the at least one electrode when the battery is functionally discharged is a fluid pressure gauge which reads the pressure of the fluid in the hydraulic load cell and wherein the gauge is marked to show the reading of the gauge when the battery is fully charged and the reading when the battery is functionally discharged.

14. Apparatus for determining the charge of a battery according to claim 6, wherein the at least one electrode has a true weight and a sensible weight, the sensible weight being the difference between the true weight of the at least one electrode and the buoyancy force of the electrolyte acting on the at least one electrode, wherein the electrolyte has a density and the buoyancy force of the electrolyte varies depending upon the density of the electrolyte, and additionally including means for determining the density of the battery electrolyte, and means for correcting the sensible weight of the at least one electrode for the buoyancy effects of the electrolyte density.

15. Apparatus for determining the charge of a battery according to claim 14, wherein the means for determining the density of the battery electrolyte includes a body of known mass and volume suspended in the battery electrolyte, the body of known mass and volume having a true weight and a sensible weight, the sensible weight being the difference between the true weight of the body of known mass and volume and the buoyancy force of the electrode acting on the body of known mass and volume, and a load cell supporting the body of known mass and volume which measures the sensible weight of the body in the electrolyte and produces an electrical signal representative of the sensible weight of the body, the sensible weight of the body in the electrolyte being related to the density of the electrolyte.

16. Apparatus for determining the charge of a battery according to claim 15, wherein the electrolyte has a temperature, including means for measuring the temperature of the electrolyte, and wherein the means relating the measured weight corrects the sensible weight for effects of the temperature of the electrolyte.

17. Apparatus for determining the charge of a battery according to claim 9, wherein the set of electrodes of one polarity are anodes and the set of electrodes of opposite polarity are cathodes, wherein the sets of electrodes are bound together as an electrode package, wherein the means suspending the electrode package includes two hangers extending from the electrode package, one of the hangers being connected to the anodes in the electrode package and serving as one cell terminal and the other of the hangers being connected to the cathodes in the electrode package and serving as the another cell terminal, and wherein flexible conductors are in electrical contact with the hangers.

18. Apparatus for determining the charge of a battery according to claim 17, wherein the battery includes a battery casing and battery casing extension and means securely attaching respective ends of the flexible conductors to the battery casing extension to prevent sensible weight measurement distorting tensions on the cell terminals.

19. Apparatus for determining the charge of a battery according to claim 17, wherein the battery includes a battery casing having a top and wherein each hanger extends from the electrode package through the battery casing top and is supported by a separate load cell positioned on the battery casing top for measuring the portion of the electrode package sensible weight supported by the hanger.

20. Apparatus for determining the charge of a battery according to claim 17, wherein the battery includes a battery casing having a top, a rigid beam positioned above the battery casing top, hinge means hingedly securing one end of the rigid beam to the battery casing, a load cell positioned between the rigid beam and the battery casing top spaced along the beam from the hinge means, and wherein each hanger extends from the electrode package through the battery casing top to connection to the rigid beam whereby the load cell measures the sensible weight of the electrode package.

21. Apparatus for determining the charge of a battery according to claim 20, wherein the battery casing additionally includes an extension thereof extending over the rigid beam, and spring means positioned between the extension and the rigid beam to prevent free upward movement of the rigid beam and electrode package suspended therefrom.

22. Apparatus for determining the charge of a battery according to claim 21, additionally including a body of known mass and volume suspended in the battery electrolyte, the body of known mass and volume having a true weight and a sensible weight, the sensible weight being the difference between the true weight of the body of known mass and volume and the buoyancy force of the electrolyte acting on the body of known mass and volume, a load cell supporting the body of known mass and volume which measures the sensible weight of the body in the electrolyte and produces an electrical density signal representative of the sensible weight of the body, the sensible weight of the body in the electrolyte being related to the density of the electrolyte, spring means urging the body of known mass and volume downwardly to prevent free upward movement of said body, and means for correcting the sensible weight of the electrode package for effects of electrolyte density.

23. Apparatus for determining the charge of a battery according to claim 22, additionally including means to prevent lateral movements of the electrode package with respect to the battery housing during movement of the battery, and means for preventing lateral movements of the body of known mass and volume with respect to the battery housing during movement of the battery.

24. Apparatus for determining the charge of a battery according to claim 23, wherein the hangers each pass through a round opening in the casing top and including flexible diaphragms sealing each opening, said flexible diaphragms offering minimal resistance against small vertical movements of the hangers but preventing any expulsion of the liquid electrolyte during movement of the battery.

25. Apparatus for determining the charge of a battery according to claim 23, including means for time averaging the electrical signals representative of the sensible weight of the electrode package, and for time averaging the electrical signals representative of the sensible weight of the body of known mass and volume, whereby erroneous signals caused by battery vibration and movement are filtered out and a filtered density corrected signal representative of electrode package weight is obtained.

26. Apparatus for determining the charge of a battery according to claim 25, wherein the battery includes at least one cell having vertical walls and is mounted on a battery base support, and further including a compensation compartment mounted on the battery base support and having vertical walls parallel to the vertical walls of the at least one cell, a fixed mass having a true weight positioned in the compensation compartment, said fixed mass also having an axial and a transverse weight component, spring means urging the fixed mass axially downwardly with a spring force in the compensation compartment, the axial component of the weight of the fixed mass being the difference between the sum of the total axial force and spring force and the transverse component of the true weight transferred to the compensation compartment vertical walls when the battery is not level, a load cell supporting the fixed mass in the compensation compartment which produces electrical signals representative of the axial weight component of the fixed mass, means for time averaging the electrical signals representative of the axial weight component of the fixed mass to produce a filtered compensation signal, and means for comparing the filtered density corrected signal and the filtered compensation signal to calculate the true weight of the electrode package.

27. Apparatus for determining the charge of a battery according to claim 25, wherein the means for comparing the filtered density corrected signal and the filtered compensation signal calculates the true weight of the electrode package by multiplying the filtered density corrected signal with a ratio of the true weight of the fixed mass to the filtered compensation signal.

28. Apparatus for determining the charge of a battery according to claim 27, wherein the means for comparing the filtered density corrected signal and the filtered compensation signal produces an output signal calibrated to indicate the charge of the battery by comparing the signal to a similar signal representative of the weight of the electrode package when the battery is fully charged and resting on a horizontal surface and the weight of the electrode package when the battery is functionally discharged and resting on a horizontal surface.

29. Apparatus for determining the charge of a battery according to claim 28, herein the battery includes a plurality of similar individual cells connected in electrical series for producing a higher voltage than produced by an individual cell, wherein a plurality of the individual cells are equipped with the charge indicating apparatus according to claim 28, and including a single read-out device to sequentially display the charge information from different cells along with an indication of the cell for which the charge information applies.

30. Apparatus for determining the charge of a battery according to claim 29, wherein the read-out device includes means to compare the indicated charge of the different cells and display the smallest value with a simultaneous warning signal.

31. Apparatus for use with a battery to indicate the charge in the battery wherein the battery is of the type which generates electricity through the reaction of a battery electrode with an electrolyte which causes a change in the chemical composition of the electrode and therefore a change in the weight and density of the electrode as the charge of the battery changes, and wherein the battery electrode is positioned in the battery so that as the charge of the battery changes and the weight of the electrode changes, the center of gravity of the battery moves between a position representing a fully charged battery to a position representing a functionally discharged battery, comprising:

means for mounting a battery therein; and means for producing an indication responsive to the position of the center of gravity of the battery mounted in the apparatus, the position of the center of gravity being indicative of the charge of the battery.

32. Apparatus for determining the charge of a battery according to claim 31, wherein the apparatus includes a base, wherein the means for mounting the battery therein is a balance arm pivotally mounted to the base to rotate about the pivot axis with respect to the base and come to rest at a position indicative of the position of the center of gravity of the battery mounted therein, and wherein the means for producing an indication provides a calibrated visual indication of the position of the balance arm relative to the base calibrated to indicate the charge in the battery.

33. Apparatus for determining the charge of a battery according to claim 31, wherein the means for mounting the battery therein includes a substantially vertically oriented resilient member, a battery holder mounted on the resilient member and positioned to hold a battery in a position to exert a bending torque on the resilient member to cause the resilient member to bend, and wherein a change in the center of gravity of the held battery causes a change in the bending torque applied to the resilient member and a change in the bend of the resilient member, and wherein the means for producing an indication provides a calibrated visual indication of the bend of the resilient member calibrated to indicate the charge in the battery.

34. Apparatus for determining the charge of a battery according to claim 31, wherein the means for mounting the battery therein includes a substantially vertically oriented resilient member, a battery holder mounted on the resilient member and positioned to hold a battery in a position to exert a bending torque on the resilient member to cause the resilient member to bend, and wherein a change in the center of gravity of the held battery causes a change in the bending torque applied to the resilient member and a change in the bend of the resilient member, and electrically conductive traces on the resilient member leading to the battery holder and to terminals of the battery held in the holder to connect the battery in a battery circuit while held in the holder, and wherein the means for producing an indication includes a strain-gauge formed on the resilient member to provide an electrical signal indicative of the bend of the resilient member.

35. Apparatus for determining the charge of a battery according to claim 34, wherein the means for providing an indication includes means for producing an electrical signal representative of the temperature of the resilient member, electronic circuitry connected to receive the electrical signals from the strain-gauge and the electrical signal representative of the temperature of the resilient member and to produce an output signal representative of the bend of the resilient member, and display means for displaying the output signal representative of the bend of the resilient member in terms of the charge of the battery.

36. Apparatus for determining the charge of a battery according to claim 31, wherein the apparatus includes a base, wherein the means for mounting the battery includes means pivotally mounting the battery to the base, and a load cell positioned between the battery and the base, spaced from the pivotal mounting, to resist and measure pivoting force of the battery about its pivotal mounting, the battery being positioned with respect to the battery so that the pivoting force will depend upon the position of the center of gravity of the battery and the measure of the pivoting force will be indicative of the position of the center of gravity of the battery and amount of charge in the battery, electronic circuitry for receiving electrical signals from the load cell and producing output signals representative of the position of the center of gravity of the battery, and display means for displaying the output signals in terms of the charge of the battery.

37. Apparatus for use with a battery to indicate the remaining charge in the battery according to claim 31, wherein the apparatus includes a curved surface adapted to be placed on a flat surface and to rock thereon, and wherein the means for mounting the battery is positioned so that with the apparatus placed on a flat surface and the battery mounted therein, the apparatus will rock to and come to rest at a position indicative of the position of the center of gravity of the battery.

38. A battery of the type which generates electricity through the reaction of a battery electrode with an electrolyte solution which causes a change in the chemical composition of the electrode and therefore a change in the weight and density of the electrode as the charge in the battery changes, and which battery has a cylindrical housing with a cylindrical axis and is adapted to display its state of charge, comprising:

at least one electrode within the housing located eccentrically with respect to the cylindrical axis so that as the battery discharges from a fully charged condition to a functionally discharged condition the center of gravity of the battery changes as the weight of the electrode changes; and visual indications applied to the battery housing;

whereby when the battery is placed on a flat surface with its cylindrical axis parallel to the surface, the center of gravity will cause the battery to come to rest on the surface in a particular orientation and the visual indications in that orientation will display the amount of charge remaining in the battery.

39. A battery according to claim 38, wherein the visual indications include a marking representing fully charged condition positioned on the battery housing to be on top of the battery housing when the battery comes to rest on the surface and is in fully charged condition, and a marking representing discharged condition positioned on the battery housing to be on top of the housing when the battery comes to rest on the surface and the battery is in functionally discharged condition, and gradations therebetween.

40. A battery according to claim 38, wherein the at least one electrode located eccentrically within the housing includes a zinc powder anode with zinc metal insert therein wrapped in an electrolyte soaked separator material, said separator wrapped zinc material being located in an axially eccentric position within the cylindrical housing, a cathode mixture of oxygen-rich chemicals partially surrounding the separator wrapped zinc material and having an outer surface away from the wrapped zinc material, said zinc material oxidizing during discharge of the battery, an electric collector of conductive carbon in contact with the outer surface of the cathode mixture and contoured to fit inside the cylindrical housing, a thin layer of insulating material separating the electric collector from the cylindrical housing, a metal cathode button at the top of the cylindrical housing connected to the conductive carbon and insulated from the cylindrical housing, a metal anode cap at the bottom of the cylindrical housing connected to the zinc metal insert and insulated from the housing, and a longitudinal cavity of cross sectional area of at least 10% of the cross sectional area of the separator wrapped zinc material located immediately adjacent a side of the separator wrapped zinc material away from the cylindrical axis and between the separator wrapped zinc material and the thin layer of insulating material to provide an expansion space for the separator wrapped zinc material during oxidation and discharge of the battery, the location of the longitudinal cavity being such to amplify the shift in the center of gravity of the battery as the zinc material oxidizes during discharge of the battery.

41. A battery according to claim 40, including a light, porous, and shrinkable material filling the longitudinal cavity.

42. Apparatus for determining the charge of a battery according to claim 36, for use in weightless environments, additionally including a support platform to which the base is secured, means for causing oscillatory movement of the support platform which thereby subjects the base and everything attached thereto to oscillatory acceleration forces which cause the load cell to produce electrical output signals representative of sensible weight measured during the oscillations, and wherein the electronic circuitry includes means to filter out all components of negative acceleration and to time average components of positive acceleration to thereby calculate the position of the center of gravity of the battery and produce output signals representative of the position of the center of gravity of the battery.

43. Apparatus for determining the charge of a battery according to claim 1, wherein a plurality of batteries with identical chemical compositions are connected in electrical parallel, and wherein the charge of a single battery of the plurality is determined as representative of the charge in all batteries of the plurality.

44. A method for determining the charge of a battery of a type which generates electricity through the reaction of a battery electrode with an electrolyte solution which causes a change in the chemical composition of the electrode and therefore a change in the weight of the electrode as the battery discharges, comprising the steps of:

determining the value of a parameter indicative of the weight of the electrode when the battery is substantially fully charged;

determining the value of the parameter indicative of the weight of the electrode when the battery is substantially functionally discharged;

determining at any time when it is desired to measure the charge remaining in the battery the value of the parameter indicative of the weight of the electrode at that time; and relating the value of the parameter indicative of the weight of the electrode at that time to the values of the parameter indicative of the weights when fully charged and when functionally discharged to determine the remaining charge in the battery.

45. A method for determining the charge of a battery of a type which generates electricity through the reaction of a battery electrode with an electrolyte solution which causes a change in the chemical composition of the electrode and therefore a change in the weight and density of the electrode as the battery discharges, comprising the steps of:

determining the value of a parameter indicative of the weight of the electrode at a time when it is desired to measure the charge remaining in the battery; and relating the value of the parameter indicative of the weight of the electrode at that time to the value of the parameter indicating a weight of the electrode when the battery is fully charged and a value of the parameter indicating a weight of the electrode when the battery is functionally discharged to determine the remaining charge in the battery.

46. A method for determining the charge of a battery according to claim 44, wherein the determined value of the parameter is linearly related to the value of the parameter indicating a weight of the electrode when the battery is fully charged and a weight of the electrode when the battery is functionally discharged.

47. A method for determining the charge of a battery according to claim 44, wherein the parameter determined is the weight of the electrode.

48. A method for determining the charge of a battery according to claim 44, wherein the parameter determined is the position of the center of gravity of the battery.

49. A method for determining the charge of a battery according to claim 44, wherein the parameter determined is the change in the position of the center of gravity of the battery.

50. A method of determining the charge of a battery according to claim 44, wherein the parameter measured is a relative change in the weight of the electrode in relation to a second battery electrode.

* * * * *